United States Patent
Kim et al.

(10) Patent No.: US 9,772,762 B2
(45) Date of Patent: Sep. 26, 2017

(54) VARIABLE SCALE SCROLLING AND RESIZING OF DISPLAYED IMAGES BASED UPON GESTURE SPEED

(71) Applicant: LG ELECTRONICS INC., Seoul (KR)

(72) Inventors: Bumbae Kim, Seoul (KR); Hyejeong Yoon, Gyeonggi-Do (KR); Juho Sohn, Gyeonggi-Do (KR)

(73) Assignee: LG ELECTRONICS INC., Seoul (KR)

( * ) Notice: Subject to any disclaimer, the term of this patent is extended or adjusted under 35 U.S.C. 154(b) by 301 days.

(21) Appl. No.: 13/734,842

(22) Filed: Jan. 4, 2013

(65) Prior Publication Data

US 2013/0268883 A1    Oct. 10, 2013

(30) Foreign Application Priority Data

Apr. 5, 2012 (KR) .......................... 10-2012-0035739

(51) Int. Cl.
*G06F 3/0485* (2013.01)
*G06F 3/0484* (2013.01)
*G06F 3/0488* (2013.01)

(52) U.S. Cl.
CPC ........ *G06F 3/0485* (2013.01); *G06F 3/04847* (2013.01); *G06F 3/04883* (2013.01); *G06F 2203/04802* (2013.01); *G06F 2203/04806* (2013.01); *G06F 2203/04808* (2013.01)

(58) Field of Classification Search
CPC . G06F 2203/04806; G06F 2203/04808; G06F 3/0485; G06F 2203/04802

USPC ................. 715/784, 800, 764, 769
See application file for complete search history.

(56) References Cited

U.S. PATENT DOCUMENTS

| D609,715 S | * | 2/2010 | Chaudhri | D14/486 |
|---|---|---|---|---|
| D613,300 S | * | 4/2010 | Chaudhri | D14/488 |
| D615,989 S | * | 5/2010 | Chaudhri | D14/488 |
| D624,932 S | * | 10/2010 | Chaudhri | D14/488 |
| 7,907,124 B2 | * | 3/2011 | Hillis et al. | 345/173 |
| D638,432 S | * | 5/2011 | Flik | D14/486 |
| 8,159,455 B2 | * | 4/2012 | Leung | 345/156 |
| 8,239,784 B2 | * | 8/2012 | Hotelling et al. | 715/830 |
| 8,612,884 B2 | * | 12/2013 | Capela et al. | 715/800 |
| 2006/0277488 A1 | * | 12/2006 | Cok et al. | 715/784 |
| 2007/0101282 A1 | * | 5/2007 | Goossen et al. | 715/764 |

(Continued)

OTHER PUBLICATIONS

Riverside Webster's II New Collegiate Dictionary, 1995, Houghton Mifflin Company, p. 1223.*

*Primary Examiner* — Weilun Lo
*Assistant Examiner* — David Spellman
(74) *Attorney, Agent, or Firm* — Lee Hong Degerman Kang & Waimey

(57) ABSTRACT

A method of controlling a mobile terminal includes displaying a first screen having a plurality of user selectable items and determining a speed of a first drag input received at the display. The method further includes scrolling the plurality of user selectable items of the first screen, while the first drag input is being received, for a first distance when the determined speed is below a preset speed and scrolling the plurality of user selectable items of the first screen, while the first drag input is being received, for a second distance further than the first distance when the determined speed is greater than or equal to the preset speed.

9 Claims, 21 Drawing Sheets

(56) References Cited

U.S. PATENT DOCUMENTS

| | | | |
|---|---|---|---|
| 2007/0277126 A1* | 11/2007 | Park et al. | 715/866 |
| 2009/0002335 A1* | 1/2009 | Chaudhri | G06F 3/04815 345/173 |
| 2009/0125824 A1* | 5/2009 | Andrews et al. | 715/764 |
| 2009/0210820 A1* | 8/2009 | Adachi et al. | 715/786 |
| 2009/0304359 A1* | 12/2009 | Lemay | G11B 27/105 386/353 |
| 2010/0223561 A1* | 9/2010 | Martin et al. | 715/752 |
| 2011/0074828 A1* | 3/2011 | Capela et al. | 345/661 |
| 2011/0202834 A1* | 8/2011 | Mandryk | G06F 3/04883 715/701 |
| 2012/0062604 A1* | 3/2012 | Lobo et al. | 345/684 |
| 2012/0096397 A1* | 4/2012 | Ording et al. | 715/802 |
| 2013/0185642 A1* | 7/2013 | Gammons | 715/733 |

\* cited by examiner

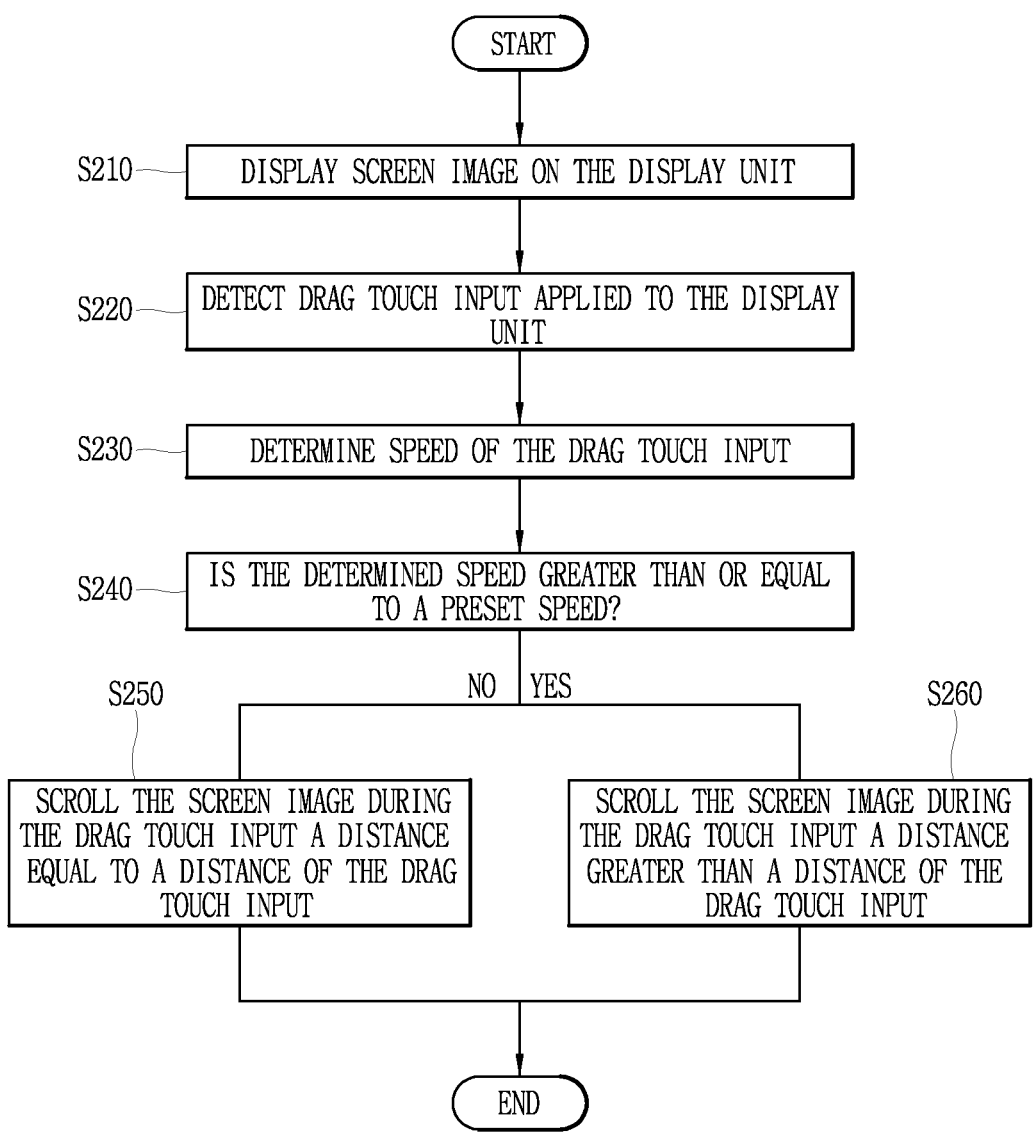

VARIABLE SCALE SCROLLING AND RESIZING OF DISPLAYED IMAGES BASED UPON GESTURE SPEED

CROSS-REFERENCE TO RELATED APPLICATIONS

Pursuant to 35 U.S.C. §119(a), this application claims the benefit of earlier filing date and right of priority to Korean Patent Application No. 10-2012-0035739, filed on Apr. 5, 2012, the contents of which are incorporated by reference herein in their entirety.

FIELD OF THE INVENTION

The present disclosure relates to a mobile terminal, and more particularly, to a mobile terminal and a control method thereof for scrolling or adjusting a scale of a screen image based on a speed and/or distance of a drag touch input received via a sensing unit.

DESCRIPTION OF THE RELATED ART

Terminals can be classified into two types, such as a mobile or portable terminal and a stationary terminal based on its mobility. Furthermore, the mobile terminal can be further classified into two types, such as a handheld terminal and a vehicle mount terminal based on whether or not it can be directly carried by a user.

Generally, terminals can be classified into mobile terminals and stationary terminals based on a presence or non-presence of mobility. Mobile terminals can also be classified into handheld terminals and vehicle mounted terminals based on whether they are configured to be carried by a user.

Multifunctional terminals operate as integrated multimedia players and are capable of capturing still images or moving images, playing music or video files, playing games and receiving broadcasts. Structural and software improvements that support and enhance the functions of the multifunctional terminals may make the terminals more convenient for users.

For example, objects such as icons, widgets, or application execution menus may be displayed on a display of the mobile terminal. The displayed objects may be scrolled along and eventually scrolled off of the display in response to a touch input, such as a drag touch input, applied to the display.

A controller of the mobile terminal may periodically check a touch position of the drag touch input and scroll the screen image displayed on the display based on the touch position. However, the scrolling speed may feel slow to a user in comparison to the speed of the input, such as via the user's finger producing the touch input.

SUMMARY

An objective of the present disclosure is to provide a mobile terminal and control method thereof capable of enhancing the user's convenience in scrolling the screen image. An embodiment of a mobile terminal may include a display configured to receive touch inputs and display a screen image, and a controller configured to detect a drag touch input received via the display, determine a speed of the received drag touch input, and control scrolling of the displayed screen image during the drag touch input such that the displayed screen image scrolls only a distance equal to a distance of the received drag touch input when the determined speed is below a preset speed and scrolls a distance greater than the distance of the received drag touch input when the determined speed is greater than or equal to the preset speed.

The controller may be further configured to detect a direction of the received drag touch input based on a starting position and a releasing position of the received drag touch input and control scrolling of the screen image on the display in either the detected direction of the received drag touch input or an inverse direction of the received drag touch input.

In an embodiment, the controller may be further configured to calculate a first scrolling distance based on only a starting position and a releasing position of the received drag touch input, wherein the first scrolling distance is equal to a distance between the starting position and the releasing position of the received drag touch input and calculate a second scrolling distance based on the starting position, releasing position, and determined speed of the received drag touch input, wherein the second scrolling distance is greater than the first scrolling distance. The controller may be further configured to control scrolling of the displayed screen image the second scrolling distance when the determined speed of the received drag touch input is equal to or greater than the preset speed, and control scrolling of the displayed screen image only the first scrolling distance when the determined speed of the received drag touch input is less than the preset speed.

In an embodiment, the controller may be further configured to control displaying of a scroll bar on the display, wherein the scroll bar indicates a distance of the scrolling. In an embodiment, the screen image includes at least a home screen, a dock screen, a cover flow, a web page, or a list.

In an embodiment, the screen image includes a first base region including at least one object and at least one second base region including at least one object, and the controller is further configured to control displaying of the first base region on the display prior to the receipt of the drag touch input while not displaying any of the at least one second base region, control scrolling of the first base region at least partially out of the display substantially in a direction of the received drag touch input, and control displaying and scrolling of at least a portion of a second base region of the at least one second base region based on the received drag touch input. The controller may be further configured to control changing of a shape of the displayed first base region and the at least one object contained in the first base region when the first base region is scrolled. The controller may be further configured to control displaying of at least a portion of the first base region in a transparent manner on the display when the first base region scrolls a distance greater than a reference distance.

An embodiment of a method of controlling a mobile terminal includes displaying a screen image on a display of the mobile terminal, detecting a drag touch input received via the display, determining, via a controller of the mobile terminal, a speed of the received drag touch input, and controlling, via the controller, scrolling of the displayed screen image during the drag touch input such that the displayed screen image scrolls only a distance equal to a distance of the received drag touch input when the determined speed is below a preset speed and scrolls a distance greater than the distance of the received drag touch input when the determined speed is greater than or equal to the preset speed.

In an embodiment, the method also includes detecting a direction of the received drag touch input based on a starting position and a releasing position of the received drag touch input, and controlling scrolling of the screen image on the display in either the detected direction of the received drag touch input or an inverse direction of the received drag touch input. In an embodiment, the screen image includes at least a home screen, a dock screen, a cover flow, a web page, or a list.

In an embodiment, the method also includes calculating a first scrolling distance based on only a starting position and a releasing position of the received drag touch input, wherein the first scrolling distance is equal to a distance between the starting position and the releasing position of the received drag touch input, and calculating a second scrolling distance based on the starting position, releasing position, and determined speed of the received drag touch input, wherein the second scrolling distance is greater than the first scrolling distance. Controlling scrolling of the displayed screen image may include controlling scrolling of the displayed screen image the second scrolling distance when the determined speed of the received drag touch input is equal to or greater than the preset speed, and controlling scrolling of the displayed screen image only the first scrolling distance when the determined speed of the received drag touch input is less than the preset speed.

In an embodiment, the screen image includes a first base region including at least one object and at least one second base region including at least one object, and the method further includes controlling displaying of the first base region on the display prior to the receipt of the drag touch input while not displaying any of the at least one second base region, scrolling of the first base region at least partially out of the display substantially in a direction of the received drag touch input, and displaying and scrolling of at least a portion of a second base region of the at least one second base region based on the received drag touch input. The method may include controlling changing of a shape of the displayed first base region and the at least one object contained in the first base region when the first base region is scrolled. The method may include controlling displaying of at least a portion of the first base region in a transparent manner on the display when the first base region scrolls a distance greater than a reference distance.

In an embodiment, a mobile terminal includes a display configured to receive touch inputs and display a screen image, and a controller configured to detect a first drag touch input and a second drag touch input received substantially simultaneously via the display, wherein the first drag touch input and the second drag touch input are in substantially opposite directions toward each other or away from each other, determine a speed of the received first drag touch input and a speed of the received second drag touch input, and control changing of a scale of the screen image during the first drag touch input and the second drag touch input such that the scale changes by a first factor corresponding only to a distance of the first drag touch input and a distance of the second drag touch input when the determined speed of the first drag touch input and the second drag touch input is below a preset speed and changes by a second factor corresponding to the distance of the first drag touch input, the distance of the second drag touch input, and the determined speed when the determined speed is greater than or equal to the preset speed, wherein the second factor is greater than the first factor.

In an embodiment, the controller is further configured to control enlarging the scale of the screen image when the first drag touch input and the second drag touch input are in the direction away from each other, and control reducing the scale of the screen image when the first drag touch input and the second drag touch input are in the direction toward each other.

An embodiment of a method of controlling a mobile terminal includes controlling displaying of a screen image, via a controller of the mobile terminal, on a display of the mobile terminal, detecting, via the controller, a first drag touch input and a second drag touch input received substantially simultaneously via the display, wherein the first drag touch input and the second drag touch input are in substantially opposite directions toward each other or away from each other, determining, via the controller, a speed of the received first drag touch input and a speed of the received second drag touch input, and controlling, via the controller, changing of a scale of the screen image during the first drag touch input and the second drag touch input such that the scale changes by a first factor corresponding only to a distance of the first drag touch input and a distance of the second drag touch input when the determined speed of the first drag touch input and the second drag touch input is below a preset speed and changes by a second factor corresponding to the distance of the first drag touch input, the distance of the second drag touch input, and the determined speed when the determined speed is greater than or equal to the preset speed, wherein the second factor is greater than the first factor, wherein the scale of the screen image is enlarged when the first drag touch input and the second drag touch input are in the direction away from each other, and wherein the scale of the screen image is reduced when the first drag touch input and the second drag touch input are in the direction toward each other.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

FIG. 3B is a flow chart depicting an operation of a mobile terminal.

DETAILED DESCRIPTION

Figure 1:
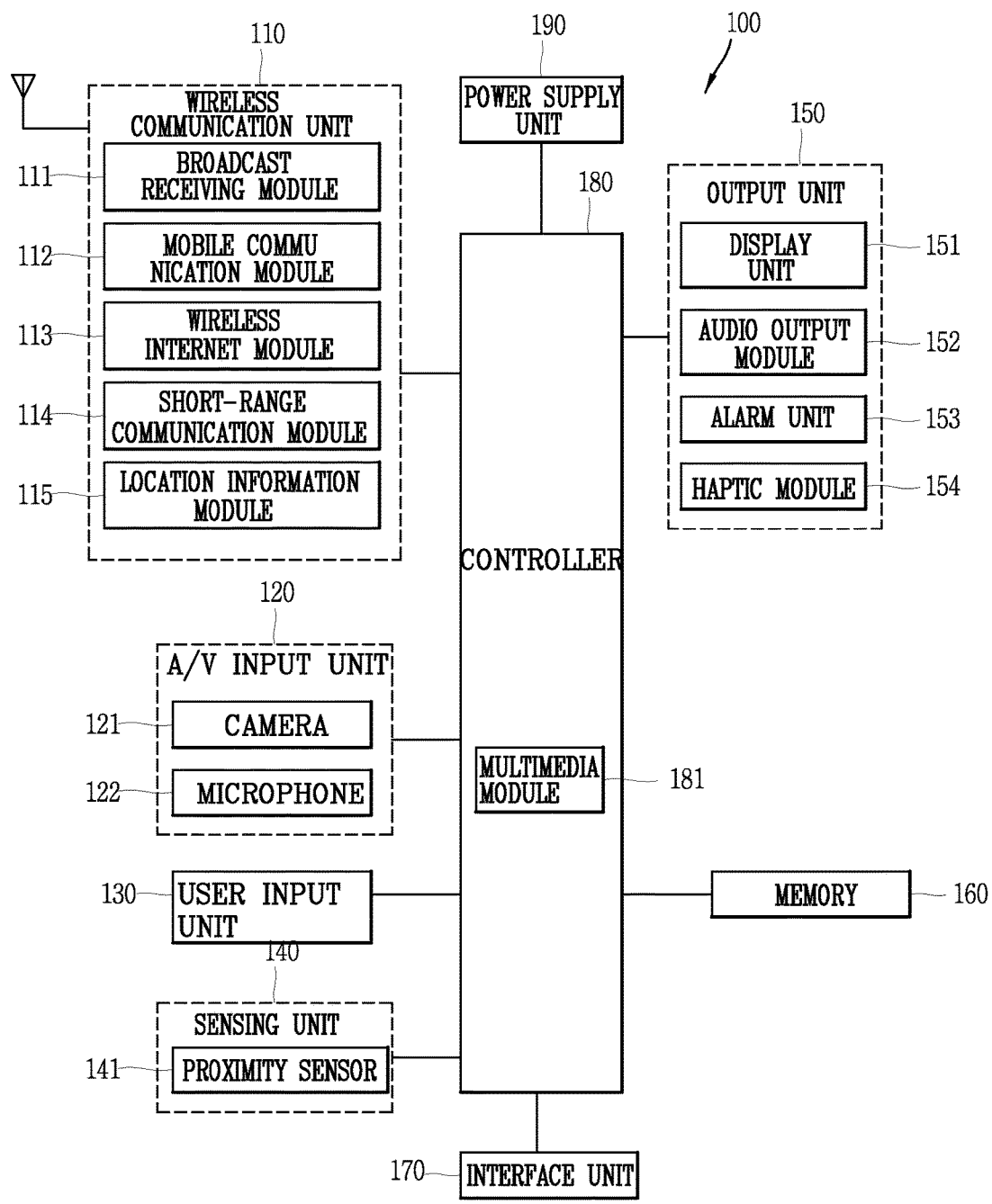
FIG. 1 is a block diagram illustrating a mobile terminal.

Hereinafter, embodiments will be described in detail with reference to the accompanying drawings. However, the such embodiments may be implemented in various forms, and therefore, these embodiments are not limited to those shown. For clarity, certain parts not related to the description are omitted, and like reference numerals designate like constituent elements throughout the specification.

As used herein, the suffixes "module" and "unit" are used for facilitation of the detailed description and do not have meanings or functions different from each other. Therefore, significant meanings or roles are not given to the suffixes themselves and it is understood that the terms 'module' and 'unit' can be used together or interchangeably.

A mobile terminal as disclosed herein may include a portable phone, a smart phone, a laptop computer, a digital broadcast mobile device, a personal digital assistant (PDA), a portable multimedia player (PMP), and a navigation system. However, it is easily understood by those skilled in the art that a configuration according to the following description may be applicable to a stationary terminal such as a digital TV or a desktop computer, excluding constituent elements particularly configured for mobile purposes.

FIG. 1 is a block diagram illustrating a mobile terminal 100. Referring to FIG. 1, the mobile terminal 100 may include a wireless communication unit 110, an audio/video (NV) input unit 120, a user input unit 130, a sensing unit 140, an output unit 150, a memory 160, an interface unit 170, a controller 180, and a power supply unit 190. Although FIG. 1 shows the mobile terminal 100 having various components, it is understood that implementing all of the illustrated components is not a requirement. Greater or fewer components may alternatively be implemented.

The wireless communication unit 110 may include one or more elements allowing radio communication between the mobile terminal 100 and a wireless communication system, or allowing radio communication between the mobile terminal 100 and a network in which the mobile terminal 100 is located. For example, the wireless communication unit 110 may include a broadcast receiving module 111, a mobile communication module 112, a wireless Internet module 113, a short-range communication module 114, and a location information module 115.

The broadcast receiving module 111 receives broadcast signals and/or broadcast associated information from an external broadcast management server through a broadcast channel. The broadcast associated information may refer to information regarding a broadcast channel, a broadcast program, and a broadcast service provider. The broadcast associated information may also be provided through a mobile communication network, in which case, the broadcast associated information may be received by the mobile communication module 112. The broadcast signal and broadcast-associated information received through the broadcast receiving module 111 may be stored in the memory 160.

The mobile communication module 112 transmits/receives wireless signals to/from at least one of a base station, an external terminal or a server over a mobile communication network. The wireless signals may represent, for example, voice call signals, video telephony call signals or data in various forms according to the transmission/reception of text and/or multimedia messages.

The wireless Internet module 113 supports Internet access for the mobile terminal 100. The wireless Internet module 113 may be internally or externally coupled to the mobile terminal 100. Suitable technologies for wireless Internet include, but are not limited to, WLAN (Wireless LAN), Wi-Fi®, Wibro® (Wireless broadband), Wimax® (World Interoperability for Microwave Access), and HSDPA (High Speed Downlink Packet Access).

The short-range communication module 114 facilitates relatively short-range communications. Suitable technologies for short-range communication include, but are not limited to, radio frequency identification (RFID), infrared data association (IrDA), ultra-wideband (UWB), as well as networking technologies such as Bluetooth® and ZigBee®.

The location information module 115 identifies or otherwise obtains a location of the mobile terminal 100. The location information module 115 may obtain position information by using a global navigation satellite system (GNSS), as an example.

With continued reference to FIG. 1, the audio/video (A/V) input unit 120 may be configured to provide audio or video signal input to the mobile terminal 100. The NV input unit 120 may include a camera 121 and a microphone 122. The camera 121 processes image frames of still pictures or video obtained by an image sensor in a photographing mode or a video telephony mode. The processed image frames may be displayed on a display unit 151.

The image frames processed by the camera 121 may be stored in the memory 160 or transmitted to an external device through the wireless communication unit 110. Optionally, the mobile terminal 100 can include two or more cameras 121, if appropriate.

The microphone 122 receives an external audio signal while the mobile terminal 100 is in a particular mode, such as a phone call mode, a recording mode and/or a voice recognition mode. The received audio signal is processed and converted into digital data. In the call mode, the processed digital data is transformed into a format transmittable to a mobile communication base station via the mobile communication module 112 and then output. Furthermore, the mobile terminal 100, and in particular the A/V input unit 120, may include a noise removing algorithm to remove noise generated during the course of receiving the external audio signal.

The user input unit 130 generates input data in response to user manipulation of an associated input device or devices. Examples of such devices include a keypad, a dome switch, a static pressure/capacitance touchpad, a jog wheel and a jog switch. A specific example of the user input unit 130 is a touch screen in which a touchpad is combined with a display, as will be described below.

The sensing unit 140 provides status measurements of various aspects of the mobile terminal 100. For example, the sensing unit 140 may detect an open/closed status of the mobile terminal 100, relative positioning of components, such as a display and a keypad of the mobile terminal 100, a change of position of the mobile terminal 100 or a component of the mobile terminal 100, a presence or absence of user contact with the mobile terminal 100, an orientation of the mobile terminal 100 and/or acceleration/deceleration of the mobile terminal 100.

As an example, the mobile terminal 100 may be configured as a slide-type mobile terminal in which the sensing unit 140 may sense whether a sliding portion of the mobile terminal 100 is open or closed. The sensing unit 140 may also sense a presence or absence of power provided by the power supply unit 190 or a presence or absence of a coupling or other connection between the interface unit 170 and an external device. The sensing unit 140 may include a proximity sensor 141.

The output unit 150 generates output relevant to the senses of sight, hearing and touch. The output unit 150 may include a display unit 151, an audio output module 152, an alarm unit 153, and a haptic module 154.

The display unit 151 displays information processed by the mobile terminal 100. For example, when the mobile terminal 100 is in a call mode, the display unit 151 may display a user interface (UI) or a graphic user interface (GUI) associated with the call. If the mobile terminal 100 is in a video communication mode or a photograph mode, the display unit 151 may display a photographed and/or received picture, a UI or a GUI.

The display unit 151 may include a liquid crystal display (LCD), a thin film transistor liquid crystal display (TFT LCD), an organic light-emitting diode (OLED), a flexible display, or a 3-dimensional display. The mobile terminal 100 may include one or more of such displays.

The display unit 151 may have a transparent or light-transmittive type configuration, hereinafter referred to as a transparent display. A transparent OLED (TOLED) is an example of a transparent display. A rear configuration of the display unit 151 may also have the light-transmittive type configuration. In this configuration, a user is able to see an object located behind the terminal body via the area occupied by the display unit 151 of the terminal body.

At least two display units 151 may be provided. For example, a plurality of display units 151 may be provided on a single face of the mobile terminal 100 spaced apart from each other or built in one body. Alternatively, each of a plurality of display units 151 may be provided on different faces of the mobile terminal 100.

If the display unit 151 and a sensor for detecting a touch action (hereafter referred to as a 'touch sensor') are constructed in a mutual-layered structure (hereafter referred to as a 'touch screen'), the display unit 151 may be used as an input device and an output device. For example, the touch sensor may include a touch film, a touch sheet or a touchpad.

The touch sensor can be configured to convert a pressure applied to a specific portion of the display unit 151 or a variation of electrostatic capacity generated from a specific portion of the display unit 151 to an electric input signal. The touch sensor may detect a pressure of a touch as well as a touched position or magnitude of the touch.

If a touch input is made to the touch sensor, a signal(s) corresponding to the touch input is transferred to a touch controller (not shown). The touch controller processes the signal(s) and then transfers corresponding data to the controller 180. The controller 180 may determine which portion of the display unit 151 is touched.

With continued reference to FIG. 1, a proximity sensor 141 can be provided within the mobile terminal 100 enclosed by the touch screen or around the touch screen. The proximity sensor 141 may detect a presence or non-presence of an object approaching a specific detecting surface or an object existing around the proximity sensor 141 using an electromagnetic field strength or infrared ray without mechanical contact. Accordingly, the proximity sensor 141 may have greater durability and greater utility than a contact type sensor.

The proximity sensor 141 can include a transmittive photoelectric sensor, a direct reflective photoelectric sensor, a mirror reflective photoelectric sensor, a radio frequency oscillation proximity sensor, an electrostatic capacity proximity sensor, a magnetic proximity sensor or an infrared proximity sensor. If the touch screen is an electrostatic type touch screen, the proximity sensor 141 may detect proximity of a pointer using a variation of an electric field according to the proximity of the pointer and the touch screen or touch sensor may be classified as the proximity sensor 141.

An action in which a pointer approaches the touch screen without contacting the touch screen, yet is recognized as being located on the touch screen, is referred to as a 'proximity touch'. An action in which the pointer actually touches the touch screen is referred to as a 'contact touch'. The position on the touch screen proximity-touched by the pointer refers to the position of the pointer that vertically opposes the touch screen when the pointer performs the proximity touch.

The proximity sensor 141 may detect a proximity touch and/or a proximity touch pattern, such as proximity touch distance, proximity touch duration, proximity touch position or proximity touch shift state. Information corresponding to the detected proximity touch action and/or the detected proximity touch pattern may be displayed on the touch screen.

The audio output module 152 may output audio data that is received from the wireless communication unit 110 in, for example, a call-receiving mode, a call-placing mode, a recording mode, a voice recognition mode or a broadcast receiving mode. The audio output module 152 may output audio data stored in the memory 160. The audio output module 152 may output an audio signal relevant to a function, such as a call signal receiving sound, or a message receiving sound performed by the mobile terminal 100. The audio output module 152 may include, for example, a receiver, a speaker or a buzzer.

The alarm unit 153 outputs a signal for announcing an occurrence of a particular event associated with the mobile terminal 100. Typical events include a call signal reception, a message reception, a key signal input and a touch input. The alarm unit 153 may output a signal for announcing the event occurrence via vibration as well as a video signal or an audio signal. The video signal is output via the display unit 151 and the audio signal is output via the audio output module 152. Therefore, at least the display unit 151 or the audio output module 152 can be regarded as part of the alarm unit 153.

The haptic module 154 may generate various haptic effects that can be sensed by a user. Vibration is a representative tactile effect generated by the haptic module 154. Strength and pattern of the vibration generated from the haptic module 154 may be controllable. For example, vibrations differing from each other can be output by being synthesized together or can be output in sequence.

The haptic module 154 may generate various haptic effects in addition to vibration. For example, the haptic module 154 may generate an effect caused by a pin array vertically moving against skin being touched, an air injection force via an injection hole, an air suction force via a suction hole, an effect of skimming on a skin surface, an effect of contact with an electrode, an effect of electrostatic power and/or an effect of a hot/cold sense using an endothermic or exothermic device.

The haptic module 154 can be configured to provide the haptic effect via direct contact. The haptic module 154 can also be configured to enable a user to experience the haptic effect via muscular sense of a finger or an arm. Two or more haptic modules 154 can be provided based on a configuration of the mobile terminal 100.

The memory 160 is generally used to store various types of data for supporting the processing, control, and storage requirements of the mobile terminal 100. Examples of such data include program instructions for applications operating on the mobile terminal 100, contact data, phonebook data, messages, audio, still pictures, and moving pictures. A recent use history or a cumulative use frequency of each data, such as use frequency for each phonebook, each message or each multimedia, may be stored in the memory 160. Moreover, data for various patterns of vibration and/or sound to be output when a touch input is received at the touch screen may be stored in the memory 160.

The memory 160 may include, for example, a flash memory, a hard disk, a multimedia card micro type memory, a random access memory (RAM), a static random access memory (SRAM), a read-only memory (ROM), an electrically erasable programmable read-only memory (EEPROM), a programmable read-only memory (PROM), a magnetic memory, a magnetic disk an optical disk, or a card type memory, such as SD memory or XD memory. The mobile terminal 100 may operate in association with a web storage that performs a storage function of the memory 160 via the Internet.

The interface unit 170 couples the mobile terminal 100 with external devices. The interface unit 170 receives data from an external device. The interface unit 170 is supplied with power and may be configured to deliver the power to elements within the mobile terminal 100.

The interface unit 170 may be configured to enable data to be transferred from the mobile terminal 100 to an external device. The interface unit 170 may be configured to include a wired/wireless headset port, an external charger port, a wire/wireless data port, a memory card port, a port for coupling to a device having an identity module, an audio input/output (I/O) port, a video input/output (I/O) port or an earphone port.

The identity module is a chip or card that stores various types of information for authenticating a use authority of the mobile terminal 100 and can include a user identity module (UIM), a subscriber identity module (SIM) and/or a universal subscriber identity module (USIM). A device provided with the above identity module (hereafter referred to as an 'identity device') may be manufactured in the form of a smart card. The identity device is connectable to the mobile terminal 100 via a corresponding port.

The interface unit 170 may be configured as a passage for supplying power to the mobile terminal 100 from a cradle that is connected to the mobile terminal 100. The interface unit 170 may facilitate delivery of various command signals, which are input via the cradle by a user, to the mobile terminal 100. Various command signals input via the cradle or the power may provide an indication for recognizing that the mobile terminal 100 is correctly loaded in the cradle.

The controller 180 typically controls the overall operations of the mobile terminal 100. For example, the controller 180 performs control and processing associated with voice calls, data communications and video conferences. The controller 180 may include a multimedia module 181 that provides multimedia playback. The multimedia module 181 may be configured as part of the controller 180 or may be configured as a separate component. The controller 180 may also perform pattern recognition processing for recognizing a handwriting input performed on the touch screen as a character and/or recognizing a picture drawing input performed on the touch screen as characters or images.

The power supply unit 190 provides power required by the various components of the mobile terminal 100. The power may be internal power, external power, or combinations thereof.

Embodiments described herein may be implemented within a recording medium that can be read by a computer or a computer-like device using software, hardware or combinations thereof. For hardware implementations, arrangements and embodiments may be implemented using at least one of application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors or electrical units for performing other functions. Such embodiments may also be implemented by the controller 180.

For a software implementation, arrangements and embodiments described herein may be implemented with separate software modules, such as procedures and functions, each of which may perform one or more of the functions and operations described herein. Software codes may be implemented with a software application written in any suitable programming language and may be stored in the memory 160 and executed by the controller 180.

When using the mobile terminal 100, the user input unit 130 may be manipulated to receive a command for controlling the operation of the mobile terminal 100. As described in more detail below, the user input unit may include a plurality of manipulation units. The plurality of manipulation units may be referred to as a manipulating portion and may adopt any mechanism of a tactile manner that enables a user to perform a manipulation action by experiencing a tactile feeling.

Various visual information may be displayed on the display unit 151. For example, visual information may be displayed as a character, numeral, symbol, graphical image, or icon. To input the visual information, at least one of the character, numeral, symbol, graphical image, or icon may be displayed in a predetermined arrangement, such as in the form of a keypad. Each key in the keypad displayed on the display unit 151 may be referred to as a "soft key."

The display unit 151 may operate in a single region or be divided into a plurality of regions. The plurality of regions may operate in an associative manner. For example, an output window, which outputs information, may be displayed in an upper region of the display unit 151 and an input window, which receives input of information, may be displayed in a lower region of the display unit 151. For example, soft keys having numerals thereon for inputting a phone number may be displayed on the input window. When the soft keys are touched, numerals corresponding to the touched soft keys are displayed on the output window. A phone call connection for the phone number displayed on the output window will be attempted or a text displayed on the output window will be entered to an application based on input received via one of the plurality of manipulation units.

The display unit 151 or touch pad may be configured to sense a touch scroll. For example, the user may place a finger or stylus on an object, such as an icon, displayed on the display unit 151 and move the object by moving the finger or stylus along the display unit 151 or touch pad. A cursor or pointer may be displayed on the display unit 151 at the location corresponding to the touch of the finger or stylus. Moreover, when the finger or stylus is moved on the display unit 151 or touch pad, a path of the finger or stylus movement may be displayed visually on the display unit 151.

When the display unit 151 and the touch pad are located on opposite sides of the mobile terminal 100, the user may simultaneously touch both the display unit 151 and the touch pad by clamping the mobile terminal 100 using, for example, a thumb and forefinger. The mobile terminal 100 may be configured to perform a determined function when the display unit 151 and touch pad are touched simultaneously or within a predetermined period of time of each other. Such functions may include an activation or de-activation of the display unit 151 or touch pad.

Figure 2A:
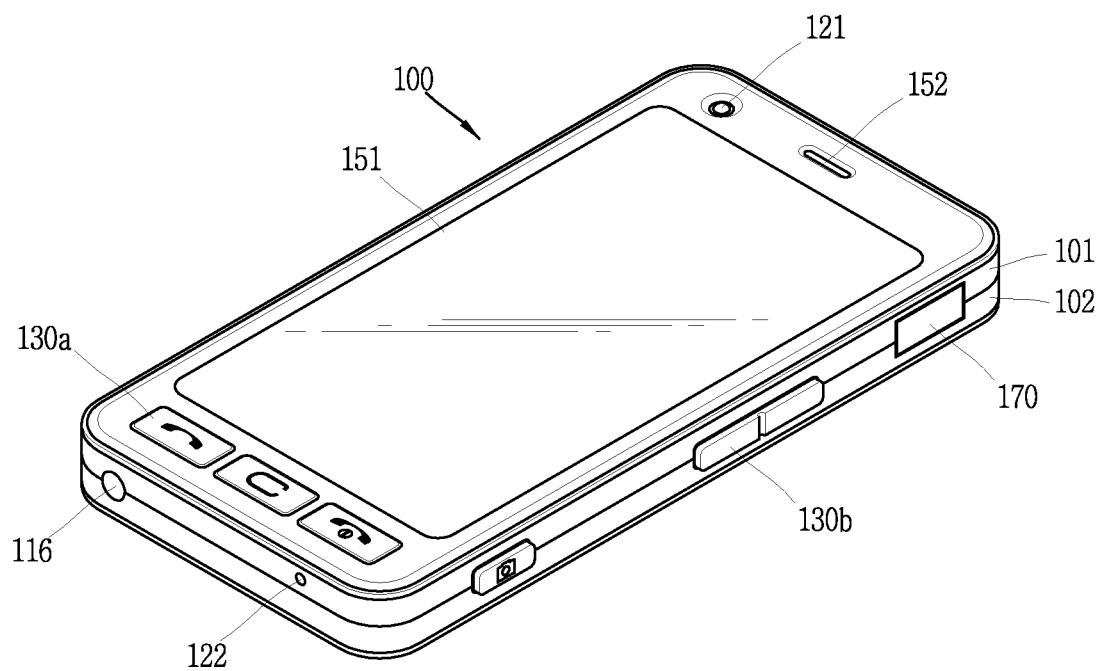
FIGS. 2A and 2B are perspective views illustrating an external appearance of a mobile terminal.
Figure 2B:
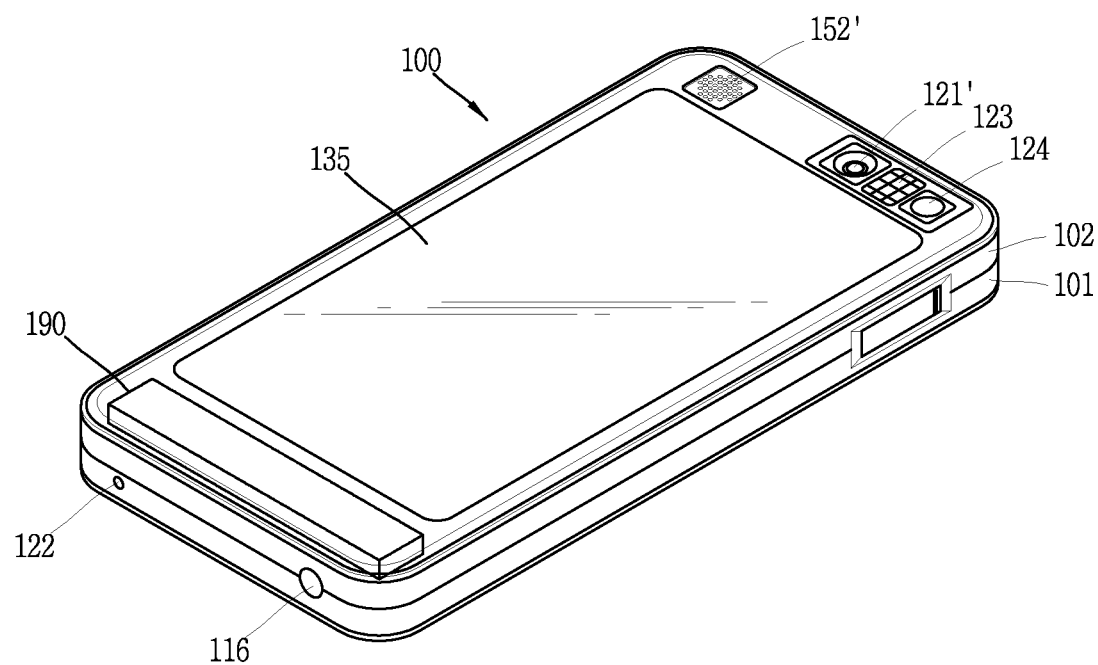

FIGS. 2A and 2B are perspective views illustrating an external appearance of the mobile terminal 100. Specifically, FIG. 2A is a front and a side view illustrating the mobile terminal 100, and FIG. 2B is a rear and the other side view illustrating the mobile terminal 100.

FIG. 2A is a front perspective view showing an example of a front of the mobile terminal 100. The mobile terminal 100 of FIG. 2 is depicted as a bar-type terminal body. However, the mobile terminal 100 may be implemented in a variety of different configurations, such as a folder-type, a slide-type, a rotational-type, a swing-type and combinations thereof. For clarity, further disclosure will primarily relate to a bar-type mobile terminal 100. However such teachings apply equally to other types of mobile terminals.

The mobile terminal 100 includes a case, such as a casing, housing, or cover, that forms an exterior of the mobile terminal. The case may be divided into a front case 101 and a rear case 102. Various electric/electronic parts are provided in a space between the front case 101 and the rear case 102. A middle case may be further provided between the front case 101 and the rear case 102. The cases can be formed by injection molding of synthetic resin or may be formed of a metallic material, such as stainless steel (STS), aluminum (Al) or titanium (Ti).

The display unit 151, audio output module 152, camera 121, first and second user manipulating units 130a and 130b, microphone 122 and/or the interface unit 170 can be provided on the terminal body, and more particularly on the front case 101.

The display unit 151 occupies most of a main face of the front case 101. The audio output module 152 and the camera 121 may be provided at an area adjacent to one end portion of the display unit 151, while the first manipulating unit 130a and the microphone 122 may be provided at an area adjacent to the other, opposite end portion of the display unit 151. The second manipulating unit 130b and the interface unit 170 can be provided on lateral sides of the front case 101 and the rear case 102.

The user input unit 130 (FIG. 1) may receive a command for controlling an operation of the mobile terminal 100. The user input unit 130 may include a plurality of manipulating units, such as the first and second manipulating units 130a and 130b. The first and second user manipulating units 130a and 130b can be named a manipulating portion and may adopt any mechanism of a tactile manner that enables a user to perform a manipulation action by experiencing a tactile feeling.

Content input via the first manipulating unit 130a or the second manipulating unit 130b can be set to be different. For example, commands such as "start," "end" and "scroll" can be input via the first manipulating unit 130a. Commands for adjusting volume of sound output from the audio output module 152 and for switching the display unit 151 to a touch recognizing mode can be input via the second manipulating unit 130b. Many other such configurations may be contemplated.

As shown in FIG. 2B, an additional camera 121' can be provided on a rear side of the terminal body, and more particularly, on the rear case 102. The camera 121' on the rear case 102 has a photographing direction that is substantially opposite to that of the camera 121 shown in FIG. 2A and may have a different resolution.

For example, the camera 121 may use a smaller number of pixels than the camera 121', and thereby have a relatively lower resolution, to capture and transmit an image of the user's face for a video call. On the other hand, the camera 121' may use a greater number of pixels than the camera 121, and thereby have a relatively greater resolution in general, for capturing an image of a general subject for photography without transmitting the captured image. The cameras 121 and 121' may be capable of being rotated in relation to the terminal body or to pop-up from the terminal body.

A flash 123 and a mirror 124 may be disposed adjacent to the camera 121'. The flash 123 projects light toward a subject when photographing the subject using the camera 121'. When a user attempts to take a picture of himself/herself (self-photography) using the camera 121', the mirror 124 enables the user to view his/her face reflected by the mirror 124.

An additional audio output module 152' can be disposed at the rear side of the terminal body. The additional audio output module 152' facilitates a stereo function in conjunction with the audio output module 152 illustrated in FIG. 2A and may be used for implementation of a speakerphone mode when communicating via the mobile terminal 100.

An antenna 116 for receiving broadcast signals may be on positioned a lateral surface of the terminal body. The antenna 116 may be part of the broadcast receiving module 111 (FIG. 1) and may be configured to be pulled out and extended from the terminal body.

The power supply unit 190 for supplying power to the mobile terminal 100 may be provided in the terminal body. The power supply unit 190 can be configured to be built within the terminal body or to be detachably connected to the terminal body.

A touch pad 135 for receiving touch input may be mounted on the rear case 102 and, as such, may be parallel to the display unit 151 that is positioned on the front case 101. The touch pad 135 may be about the same size as or smaller than the display unit 151 and may be operated in conjunction with the display unit 151. Alternatively, the touch pad 135 may be part of a touch screen, in which case information displayed on the display unit 151 in the front case 101 and information displayed on the touch screen in the rear case 102 may be controlled via input received by the touch pad 135.

Objects, such as icons, widgets or application execution menus may be displayed on the display unit 151. The objects may be moved or removed from the display unit 151 in response to a touch input, such as a drag touch input, applied to the respective objects. The controller 180 may also scroll a screen image displayed on the display unit 151 in response to a drag touch input applied to the screen image. Moreover, the controller 180 may also move objects on the display unit 151 or remove objects from the display unit 151 by scrolling the screen image.

The controller 180 may periodically check a touch position of the drag touch input applied to the display unit 151 and scroll the screen image displayed on the display unit 151 based on the drag touch input. In prior art devices, a changing of the screen image based on the scrolling the screen image may feel slow to the user in comparison to the speed of the movement of the user's finger or a stylus along the display unit 151. Accordingly, the various embodiments presented herein include a mobile terminal 100 and a control method thereof capable of enhancing the user's convenience when scrolling a screen image on the display unit 151 will be described.

Figure 3A:
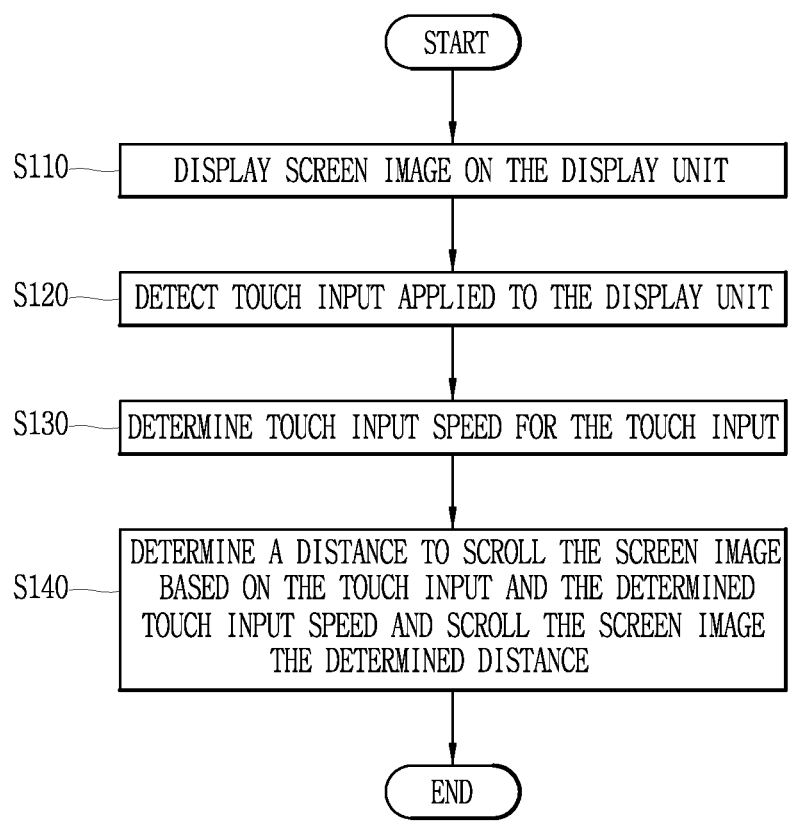
FIG. 3A is a flow chart depicting an operation of a mobile terminal.

FIGS. 3A and 3B are flow charts depicting processes of the mobile terminal 100 (FIG. 1). The mobile terminal 100 may include a display unit 151, a sensing unit 140, and a controller 180 (FIG. 1).

Referring to FIG. 3A, the process includes displaying a screen image on the display unit 151 (S110). Specifically, the controller 180 may control the display unit 151 to display the screen image. The display unit 151 may display a screen image for a home screen, a dock screen, a cover flow, a web page, or a list. The screen image may include at least one object, such as an icon, a widget, a thumbnail image, or an application execution menu. A position of the object on the screen image may be selected by the user or determined by the controller 180 (FIG. 1).

Next, a touch input received by the display unit 151 is detected (S120). Specifically, the sensing unit 140 may detect the touch input received by the display unit 151 when the screen image is displayed on the display unit 151. The touch input may be accompanied by a control command for switching the screen image from a first base region to another base region.

The touch input may include a drag touch input (touch-and-drag), a flick input (touch-and-flick), or a slide touch input (touch-and-slide). For convenience, a drag touch input will be described as an example with reference to the drawings.

Next, a speed of the touch input is determined (S130). Specifically, the sensing unit 140 may determine a drag touch input speed of the drag touch input. The drag touch input speed may be determined based on a duration of time and a distance from a start of the drag touch input to a release of the drag touch input. More specifically, the sensing unit 140 may detect a starting position and a releasing position of the drag touch input and determine a duration time of the drag touch input, a dragged distance, and a direction of the drag touch input based on the starting and releasing positions of the drag touch input.

Next, the screen image may be scrolled based on the touch input (S140). Specifically, the controller 180 may control the display unit 151 to scroll the screen image based on the drag touch input. The controller 180 may determine a distance for scrolling the screen image based on the determined speed of the drag touch input.

More specifically, the controller 180 may calculate a first scrolling distance based on the releasing position of the received drag touch input, calculate a second scrolling distance based on the determined speed of the received drag touch input, and scroll the screen image based on a sum of the first scrolling distance and the second scrolling distance. When the drag touch input speed is below a preset speed, the second scrolling distance may be reduced to zero. The screen image may be scrolled in either the direction of the received drag touch input or an inverse direction of the received drag touch input.

The controller 180 may scroll the screen image based on both the first scrolling distance and the second scrolling distance regardless of the drag touch input speed, or scroll the screen image based on only the first scrolling distance based on the drag touch input speed. Specifically, the controller 180 may control the display unit 151 to scroll the screen image based on a sum of the first scrolling distance and the second scrolling distance when the determined speed of the drag touch input is equal to or greater than a preset speed, and scroll the screen image based on only the first scrolling distance when the determined speed of the drag touch input speed is less than the preset speed.

As described above, the controller 180 may scroll the screen image displayed on the display unit 151 based on the speed of the drag touch input in addition to a touch position of the drag touch input. In other words, when the user's finger moves relatively fast along the display unit 151, the screen image can be scrolled at a relatively fast speed and at a greater distance, thereby providing the user with a feeling that the screen image is dragged by the finger, which enhances the convenience of the user when scrolling the screen image.

Referring to FIG. 3B, the process includes displaying a screen image on the display unit 151 (S210). Specifically, the controller 180 may control the display unit 151 to display the screen image. The display unit 151 may display a screen image for a home screen, a dock screen, a cover flow, a web page, or a list. The screen image may include at least one object, such as an icon, a widget, a thumbnail image, or an application execution menu. A position of the object on the screen image may be selected by the user or determined by the controller 180 (FIG. 1).

Next, a drag touch input received by the display unit 151 is detected (S220). Specifically, the sensing unit 140 may detect the drag touch input received by the display unit 151 when the screen image is displayed on the display unit 151. The drag touch input may be accompanied by a control command for switching the screen image from a first base region to another base region.

Next, a speed of the drag touch input is determined (S230). Specifically, the sensing unit 140 may determine a drag touch input speed of the drag touch input. The drag touch input speed may be determined based on a duration of time and a distance from a start of the drag touch input to a release of the drag touch input. More specifically, the sensing unit 140 may detect a starting position and a releasing position of the drag touch input and determine a duration time of the drag touch input, a dragged distance, and a direction of the drag touch input based on the starting and releasing positions of the drag touch input.

Next, a determination is made as to whether the determined speed is greater than or equal to a preset speed (S240). Specifically, the 180 controller may determine whether the determined speed is greater than or equal to a preset speed.

Next, if the determined speed is less than the preset speed, the screen image may be scrolled during the drag touch input a distance equal to a distance of the drag touch input (S250). Specifically, during the drag touch input, the controller 180 may control the display unit 151 to scroll the screen image a distance equal to the distance of the drag touch input based on the determination that the speed of the drag touch input is less than the preset speed.

Alternatively, if the determined speed is greater than or equal to the preset speed, the screen image may be scrolled during the drag touch input a distance greater than the distance of the drag touch input (S260). Specifically, during the drag touch input, the controller 180 may control the display unit 151 to scroll the screen image a distance greater than the distance of the drag touch input based on the determination that the speed of the drag touch input is greater than or equal to the preset speed.

Figure 4A:
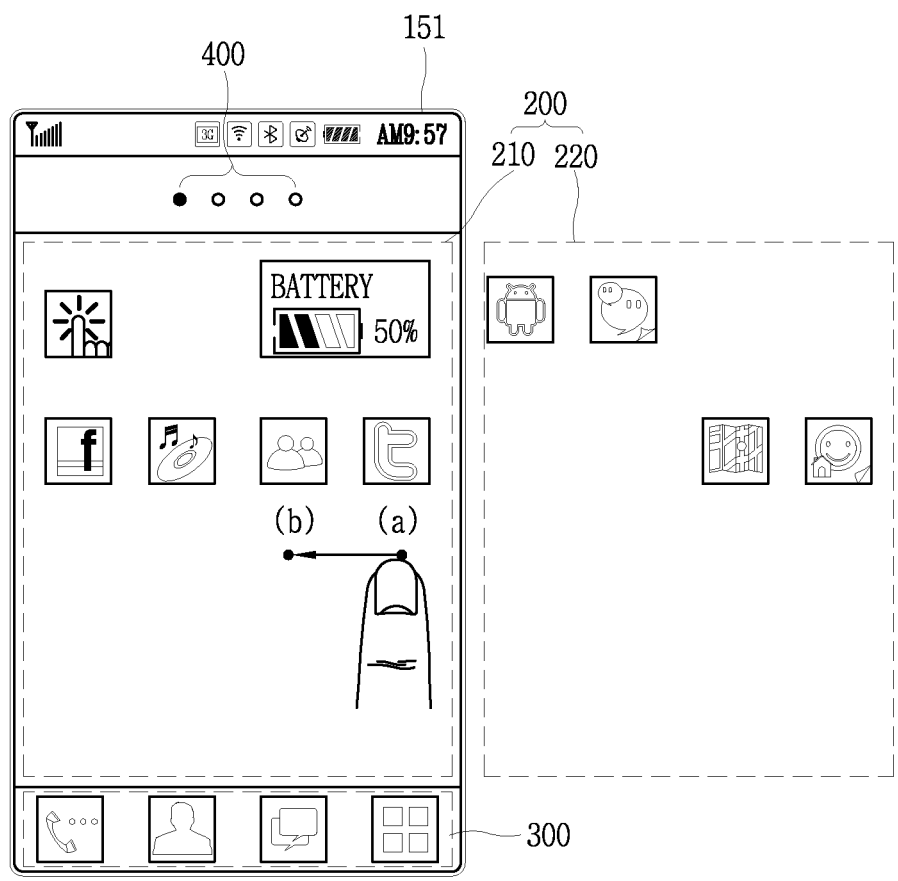
FIGS. 4A through 4C are views illustrating an example of a first operation of a mobile terminal according to FIG. 3.
Figure 4B:
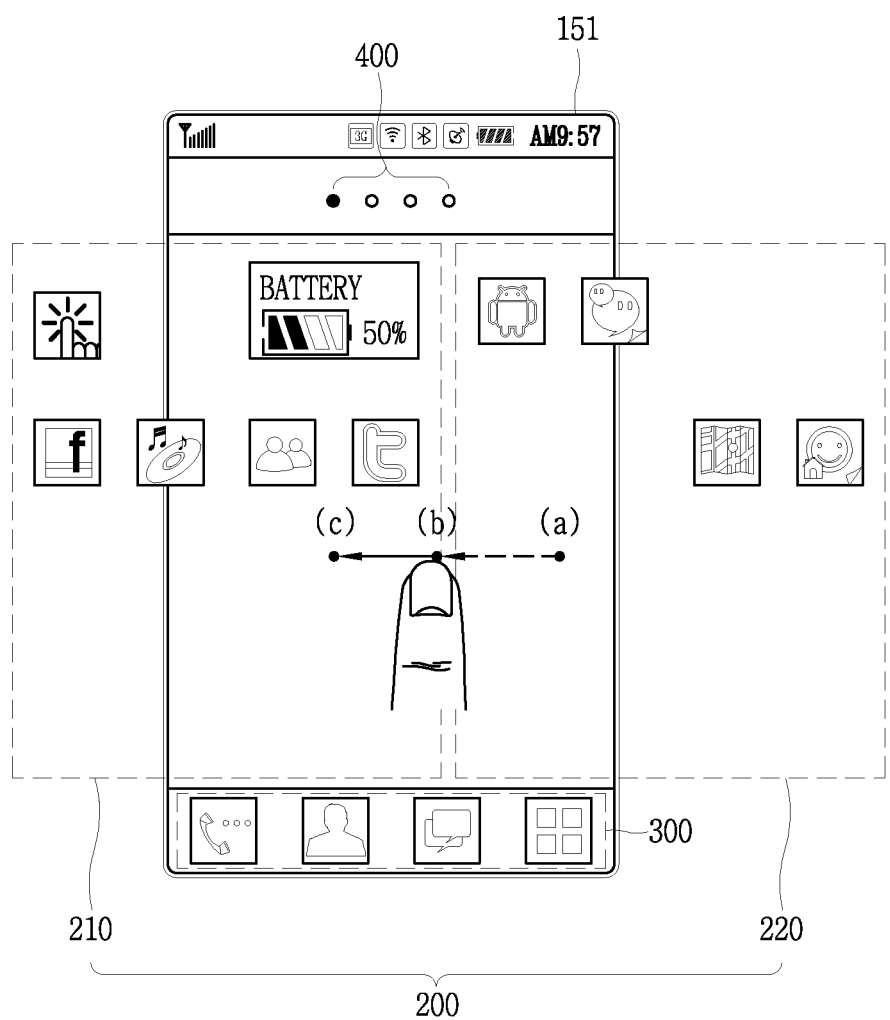
Figure 4C:
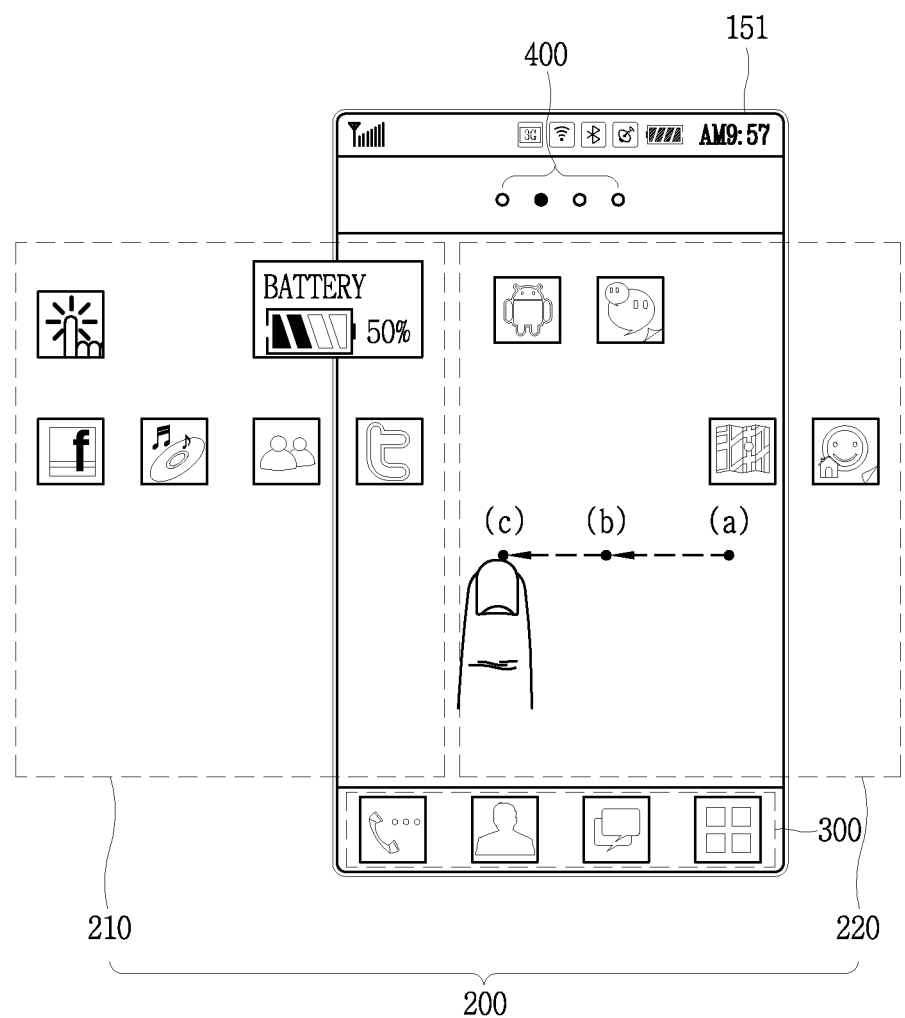

FIGS. 4A through 4C are views illustrating an example of a first operation of a mobile terminal 100 (FIG. 1) according to the method of FIGS. 3A and 3B. The mobile terminal 100 may include a display unit 151, a sensing unit 140 (FIG. 1), and a controller 180 (FIG. 1).

As illustrated in FIG. 4A, a screen image for a home screen 200 may be displayed on the display unit 151. The screen image for the home screen 200 may include a plurality of base regions, for example a first base region 210 and a second base region 220 based on a selection from the user or a number of applications installed in the mobile terminal 100.

The screen image may also include identification information 400. The identification information indicates which base region of a plurality of base regions, such as the first base region 210 or the second base region 220, is currently displayed on the display unit 151.

The screen image may further include a dock screen 300 on which icons corresponding to a predetermined specific application are fixed and displayed based on a selection from the user or the controller 180. The icons contained in the dock screen 300 may continue to be displayed on the display unit 151 even when the currently displayed base region, such as the first base region 210, is switched to another base region, such as the second base region 220.

When a drag touch input moving from position (a) to position (b) on the screen image for the home screen 200 is detected, as illustrated in FIGS. 4A-4B, a portion of the first base region 210 and a portion of the second base region 220 may be simultaneously displayed on the display unit 151 as illustrated in FIG. 4B. Specifically, a portion of the second base region 220 may be displayed while the first base region 210 is moved in the direction corresponding to the drag touch input direction. The controller 180 may determine a distance that the first base region 210 is moved using the dragged distance and drag touch input speed.

More specifically, the controller 180 may calculate a first scrolling distance based on a releasing position or current position of the drag touch input, for example position (b), and calculate a second scrolling distance based on the drag touch input speed. The controller 180 may scroll the screen image based on a sum of the first scrolling distance and the second scrolling distance. Accordingly, a distance that the first base region 210 is moved on the display unit 151 may be longer than the dragged distance.

When the drag touch input moves beyond position (b), such as to position (c) on the screen image for the home screen 200, a larger portion of the second base region 220 may be displayed while the first base region 210 is moved further in the direction corresponding to the drag touch input direction, as illustrated in FIG. 4C. Moreover, the controller 180 may calculate the first scrolling distance based on a releasing position or current position of the drag touch input, for example position (c), and calculate the second scrolling distance based on the drag touch input speed. The controller 180 may scroll the screen image for the home screen 200 based on a sum of the first scrolling distance and the second scrolling distance. Accordingly, a distance that the first base region 210 is moved on the display unit 151 may be longer than the dragged distance.

Other means for transitioning from the first base region 210 to the second base region 220 on the display unit 151 are possible. For example, when a drag touch input to the home screen 200 is detected, the first base region 210 may disappear completely from the display unit 151 and the second base region 220 may be completely displayed on the display unit 151 based on the dragged distance or drag touch input speed (not shown).

Figure 5A:
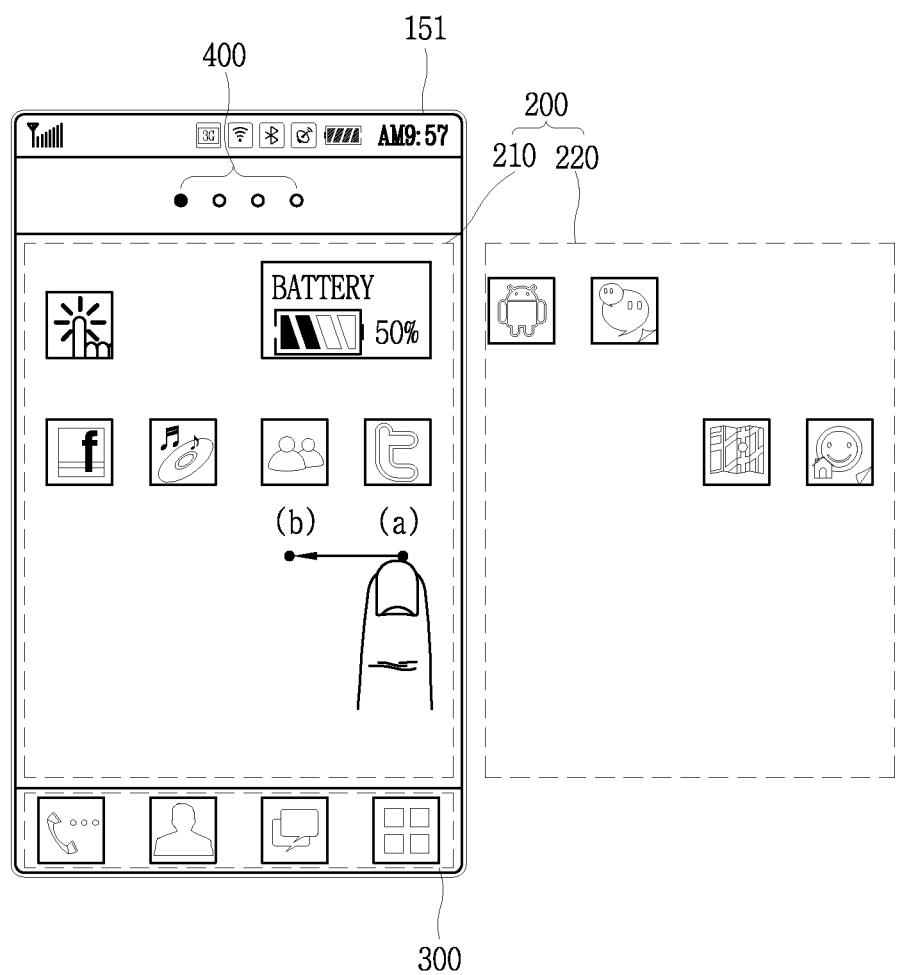
FIGS. 5A through 5C are views illustrating an example of a second operation of a mobile terminal according to FIG. 3.
Figure 5B:
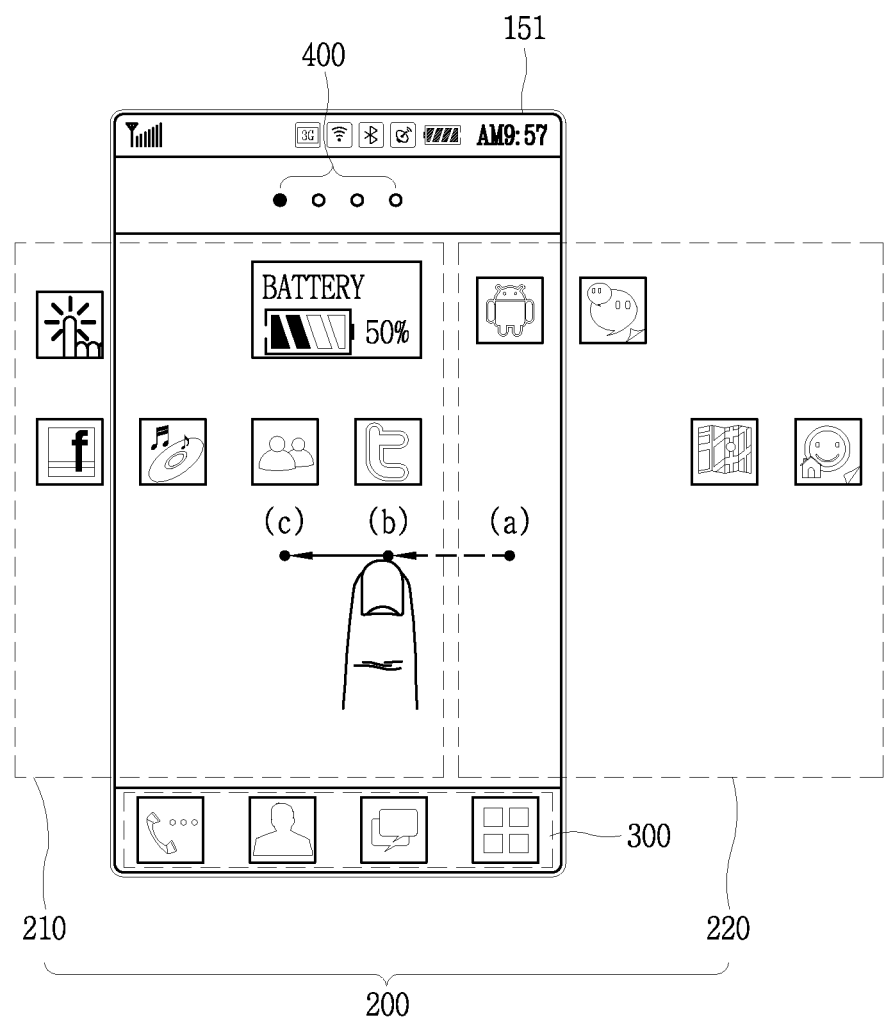
Figure 5C:
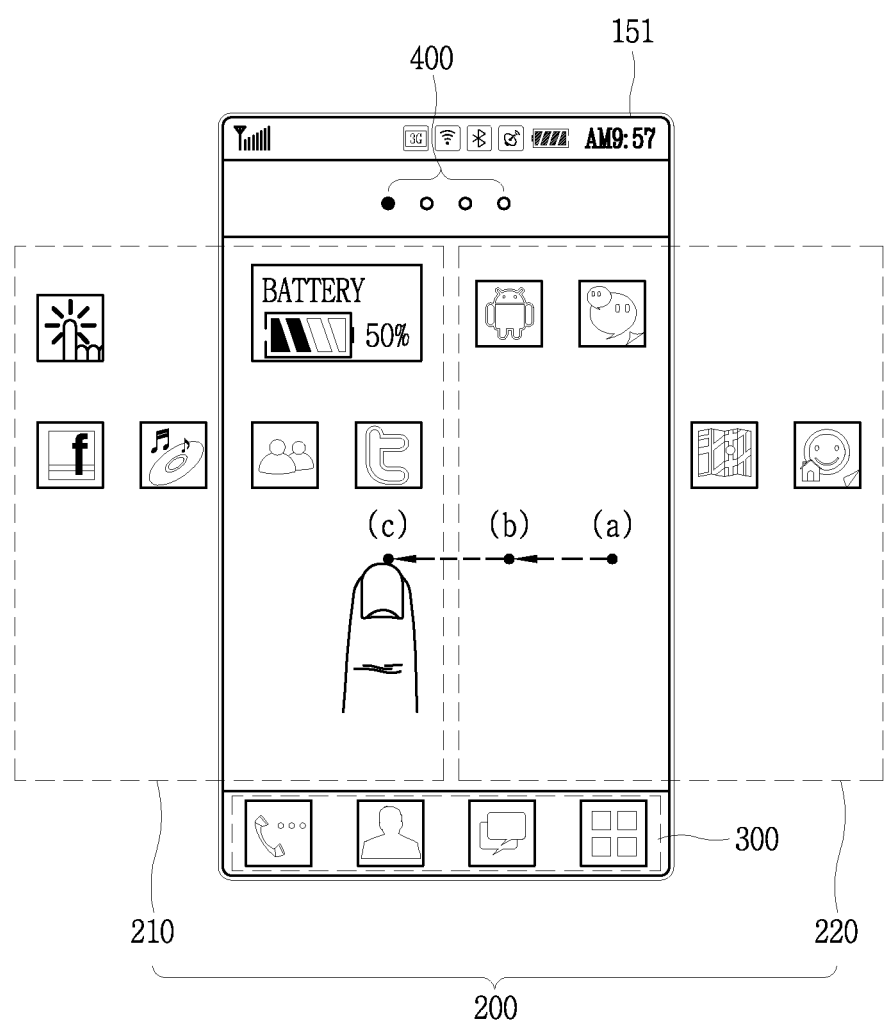

FIGS. 5A through 5C are views illustrating an example of a second operation of a mobile terminal 100 (FIG. 1) according to the method of FIGS. 3A and 3B. The mobile terminal 100 may include a display unit 151, a sensing unit 140 (FIG. 1), and a controller 180 (FIG. 1).

As illustrated in FIG. 5A, a screen image for a home screen 200 may be displayed on the display unit 151. When a drag touch input moving from position (a) to position (b) is detected, as illustrated in FIGS. 5A-5B, a portion of the first base region 210 and a portion of the second base region 220 may be simultaneously displayed on the display unit 151, as illustrated in FIG. 5B.

Specifically, a portion of the second base region 220 may be displayed while the first base region 210 is moved in the direction corresponding to the drag touch input direction. The controller 180 may scroll the screen image for the home screen 200 based on a sum of the first scrolling distance and the second scrolling distance when the drag touch input speed is equal to or greater than a preset speed, and scroll the screen image for the home screen 200 based on only the first scrolling distance when the drag touch input speed is less than the preset speed.

In other words, when the drag touch input speed is less than the preset speed, as illustrated in FIG. 5B, the controller 180 may calculate a first scrolling distance based on a releasing position or current position of the drag touch input, for example, position (b), and scroll the screen image for the home screen 200 based on the first scrolling distance. Accordingly, the dragged distance may correspond to a distance that the first base region 210 is moved on the display unit 151.

When the drag touch input moves beyond position (b), such as to position (c) on the screen image for the home screen 200, a larger portion of the second base region 220 may be displayed while the first base region 210 is moved further in the direction corresponding to the drag touch input direction, as illustrated in FIG. 5C. Moreover, the controller 180 may calculate the first scrolling distance based on a releasing position or current position of the drag touch input, for example position (c), and scroll the screen image for the home screen 200 based on the first scrolling distance. Accordingly, a distance that the first base region 210 is moved on the display unit 151 may correspond to the dragged distance.

Figure 6A:
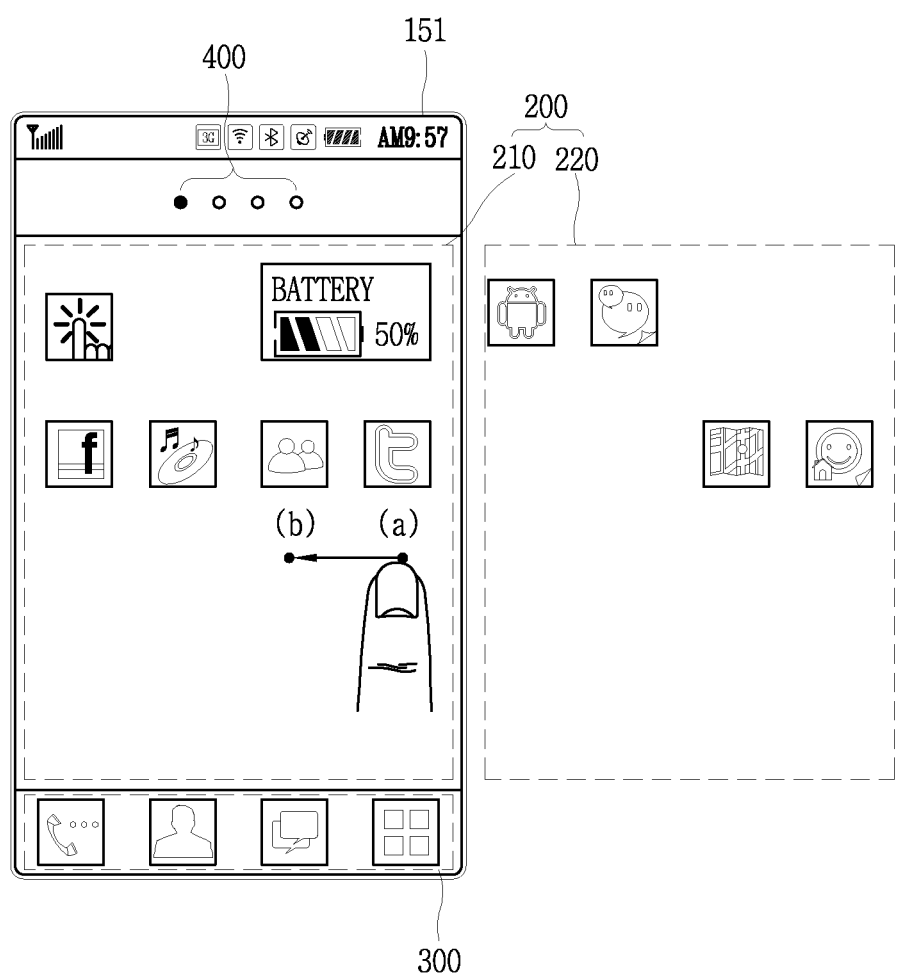
FIGS. 6A through 6C are views illustrating an example of a third operation of a mobile terminal according to FIG. 3.
Figure 6B:
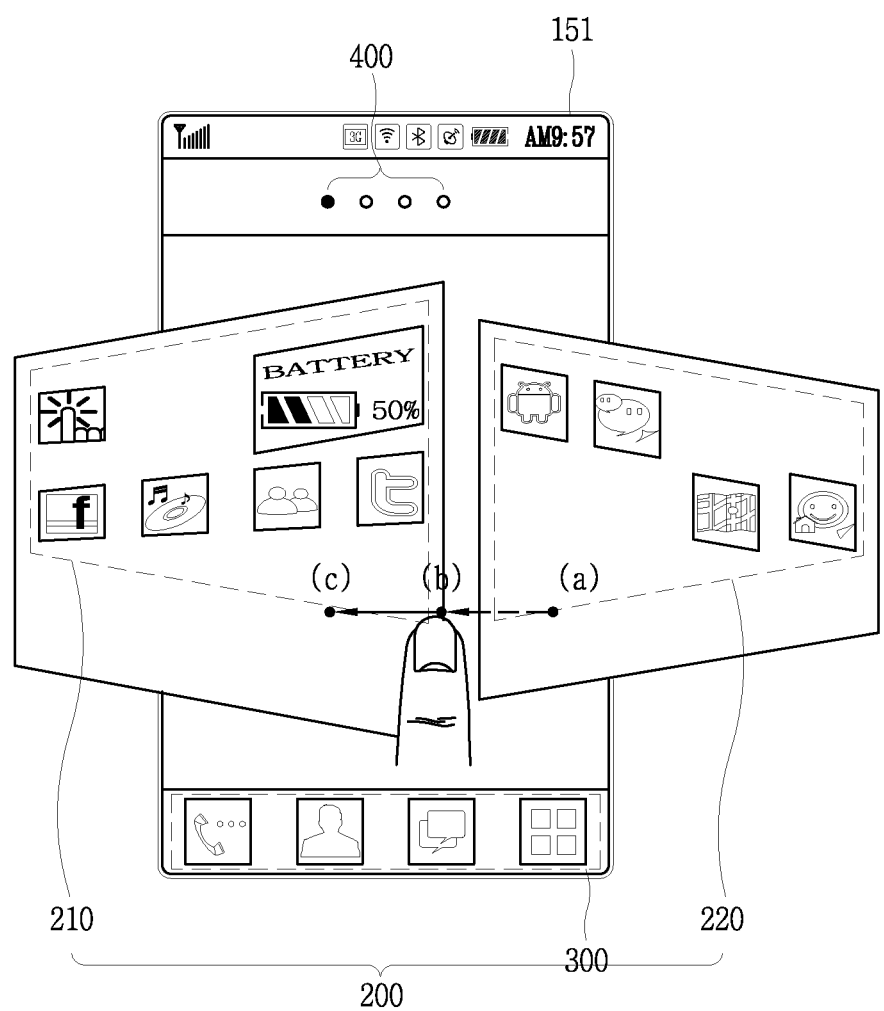
Figure 6C:
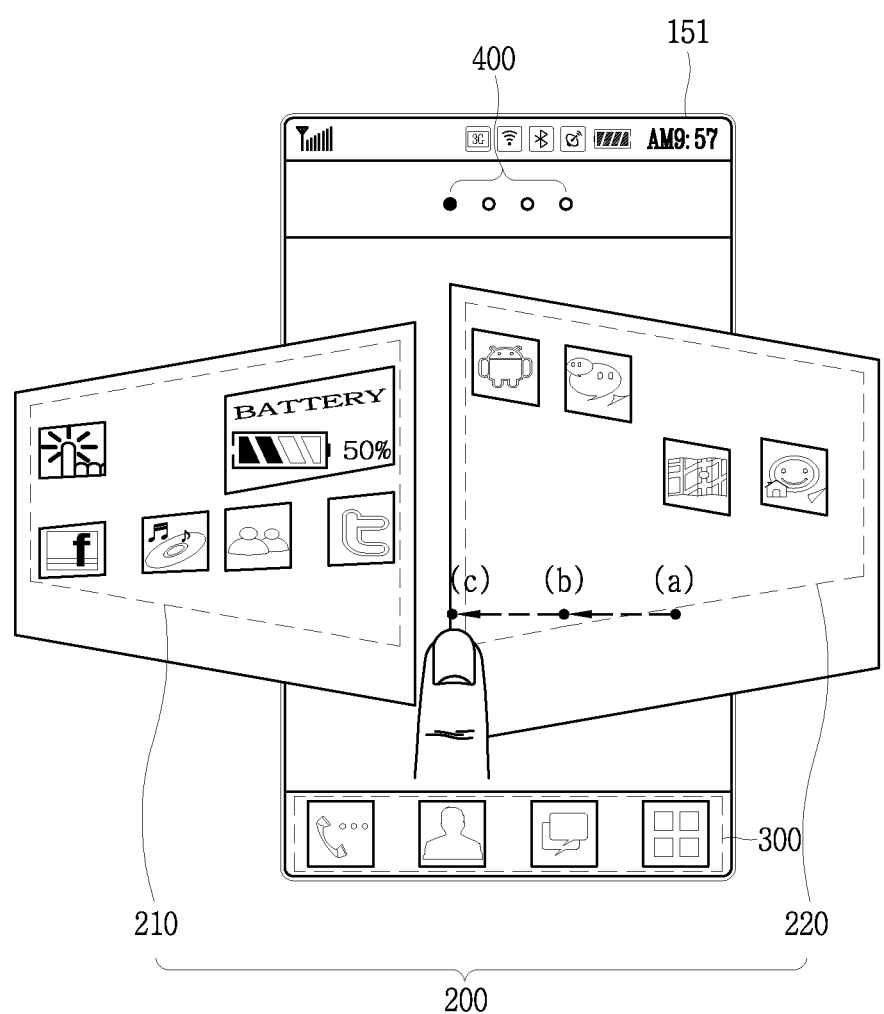

FIGS. 6A through 6C are views illustrating an example of a third operation of a mobile terminal 100 (FIG. 1) according to the method of FIGS. 3 and 3B. The mobile terminal 100 may include a display unit 151, a sensing unit 140 (FIG. 1), and a controller 180 (FIG. 1).

As illustrated in FIG. 6A, a screen image for a home screen 200 may be displayed on the display unit 151. The first base region 210 may be displayed in a rectangular shape on the display unit 151.

When a drag touch input moving from position (a) to position (b) is detected, as illustrated in FIGS. 6A and 6B, a portion of the first base region 210 and a portion of the second base region 220 may be simultaneously displayed on the display unit 151, as illustrated in FIG. 6B. The controller 180 may change a shape of the first base region 210 and objects contained in the first base region 210 while moving the first base region 210 in the drag touch input direction.

Specifically, the controller 180 may change a length of a first edge of the first base region 210 that is adjacent to the second base region 220 or a second, opposite edge of the first base region 210 such that the length of the first edge of the first base region 210 is longer than the second edge of the first base region 210. In this manner, the first base region 210 is changed from a rectangular shape to a trapezoidal shape while being moved in the drag touch input direction, and the controller 180 may similarly change a shape of the objects contained in the first base region 210.

The controller 180 may calculate the first scrolling distance based on a releasing position or current position of the drag touch input, for example position (b), and calculate a second scrolling distance based on the drag touch input speed. The controller 180 may scroll the screen image based on a sum of the first scrolling distance and the second scrolling distance.

Other means for transitioning from the first base region 210 and the second base region 220 on the display unit 151 are possible. For example, when the first base region 210 moves a distance corresponding to a reference distance, at least portion of the first base region 210 may be displayed in a transparent manner (not shown).

When the drag touch input moves beyond position (b), such as to position (c) on the screen image for the home screen 200, a larger portion of the second base region 220 may be displayed while the first base region 210 is moved further in the direction corresponding to the drag touch input direction, as illustrated in FIG. 6C. Moreover, the controller 180 may calculate the first scrolling distance based on a releasing position or current position of the drag touch input, for example position (c), and calculate the second scrolling distance based on the drag touch input speed. The controller 180 may scroll the screen image for the home screen 200 based on a sum of the first scrolling distance and the second scrolling distance.

The controller 180 may display one of the first base region 210 or the second base region 220 at a larger scale than the other of the first base region 210 or the second base region 220. For example, when the first edge of the first base region 210 has not yet reached a reference point, such as a midway point of the display unit 151, during the drag touch input, the first base region 210 may be displayed at a larger scale than the second base region 220 (FIG. 6B). However, when the first edge of the first base region 210 goes beyond the reference point during the drag touch input, the first base region 210 may be displayed at a smaller scale than the second base region 220 (FIG. 6C).

Figure 7A:
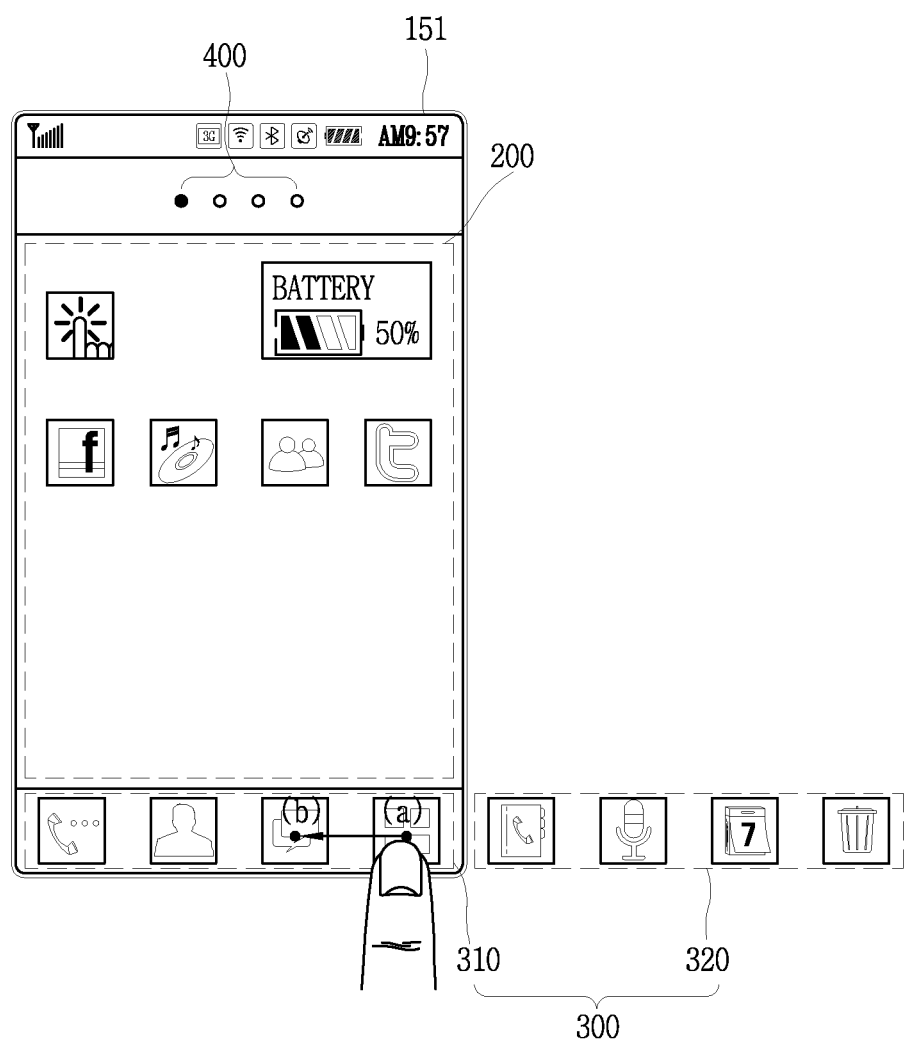
FIGS. 7A through 7C are views illustrating an example of a fourth operation of a mobile terminal according to FIG. 3.
Figure 7B:
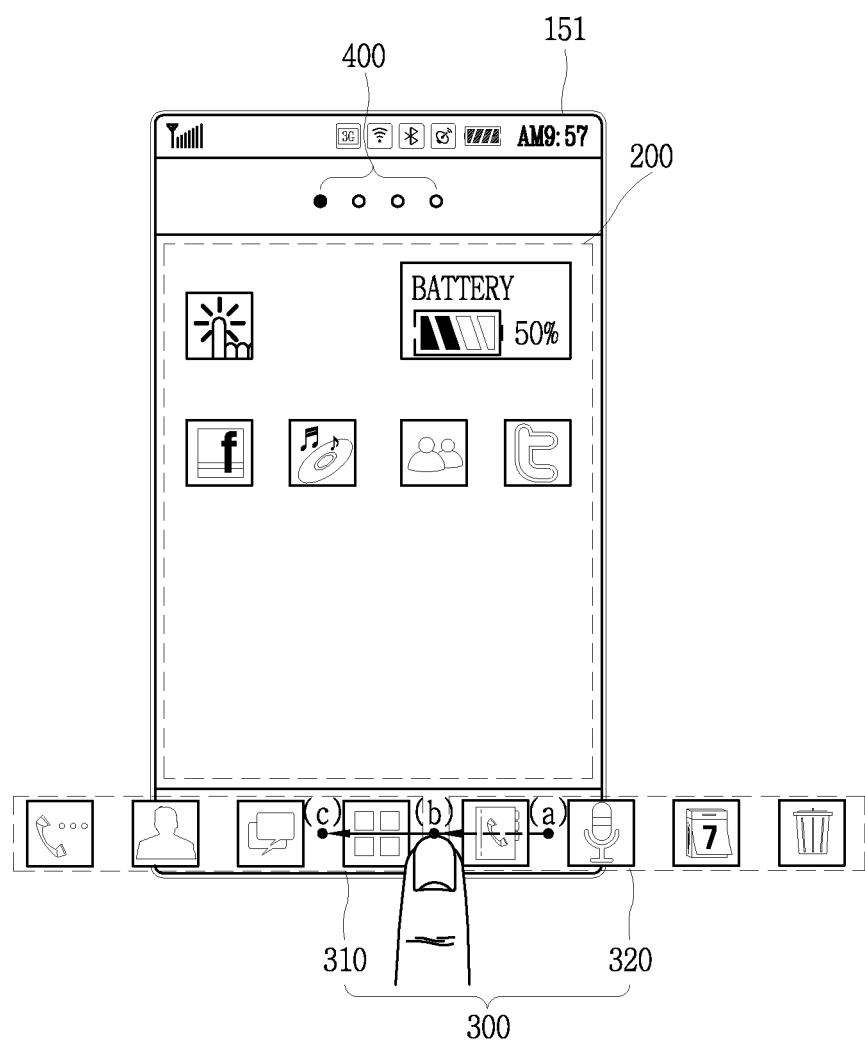
Figure 7C:
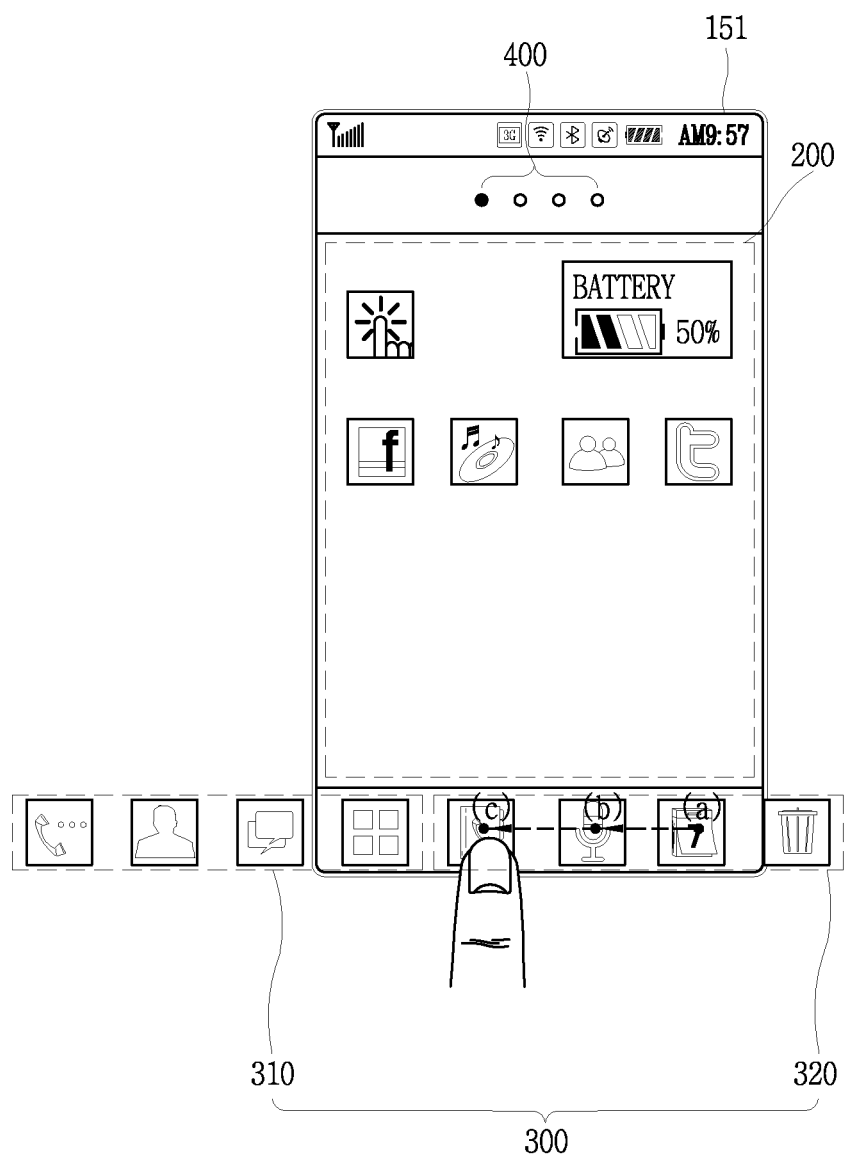

FIGS. 7A through 7C are views illustrating an example of a fourth operation of a mobile terminal 100 (FIG. 1) according to the method of FIGS. 3A and 3B. The mobile terminal 100 may include a display unit 151, a sensing unit 140 (FIG. 1), and a controller 180 (FIG. 1).

As illustrated in FIG. 7A, a screen image for a dock screen 300 may be displayed on the display unit 151. The screen image for the dock screen 300 may include a plurality of base regions, for example a first base region 310 and a second base region 320 based on a selection from the user or a number of icons corresponding to a specific application preset by the controller 180.

Furthermore, the screen image for the home screen 200 may be displayed on the display unit 151. Icons contained in the screen image for the home screen 200 may continue to be displayed on the display unit 151 when the screen image for the dock screen 300 transitions from displaying the first base region 310 to displaying the second base region 320.

When a drag touch input moving from position (a) to position (b) on the screen image for the dock screen 300 is detected, as illustrated in FIGS. 7A-7B, a portion of the first base region 310 and a portion of the second base region 320 may be simultaneously displayed on the display unit 151 as illustrated in FIG. 7B. Specifically, a portion of the second base region 320 may be displayed while the first base region 310 is moved in the direction corresponding to the drag touch input direction. The controller 180 may determine a distance that the first base region 310 is moved using the dragged distance and drag touch input speed.

More specifically, the controller 180 may calculate a first scrolling distance based on a releasing position or current position of the drag touch input, for example, position (b), and calculate a second scrolling distance based on the drag touch input speed. The controller 180 may scroll the screen image for the dock screen 300 based on a sum of the first scrolling distance and the second scrolling distance. Accordingly, a distance that the first base region 310 is moved on the display unit 151 may be longer than the dragged distance.

When the drag touch input moves beyond position (b) to position (c) on the screen image for the dock screen 300, a larger portion of the second base region 320 may be displayed while the first base region 310 is moved further in the direction corresponding to the drag touch input direction, as illustrated in FIG. 7C. Moreover, the controller 180 may calculate the first scrolling distance based on a releasing position or current position of the drag touch input, for example position (c), and calculate the second scrolling distance based on the drag touch input speed, and scroll the screen image for the dock screen 300 based on a sum of the first scrolling distance and the second scrolling distance. Accordingly, a distance that the first base region 310 is moved on the display unit 151 may be longer than the dragged distance.

FIGS. 8A, 8B, 9A, 9B, 10A and 10B are views illustrating examples of fifth through seventh operations of a mobile terminal 100 (FIG. 1) according to the method of FIGS. 3A and 3B. The mobile terminal 100 may include a display unit 151, a sensing unit 140 (FIG. 1), and a controller 180 (FIG. 1).

Figure 8A:
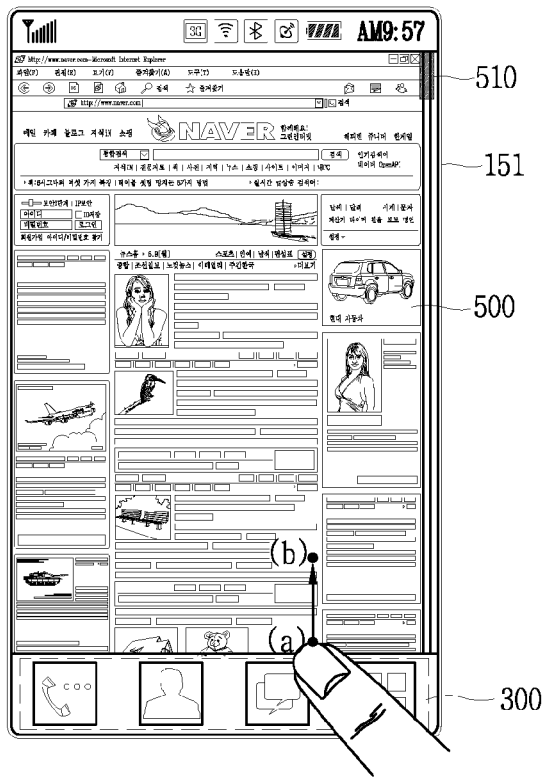
FIGS. 8A and 8B are views illustrating an example of a fifth operation of a mobile terminal according to FIG. 3.
Figure 8B:
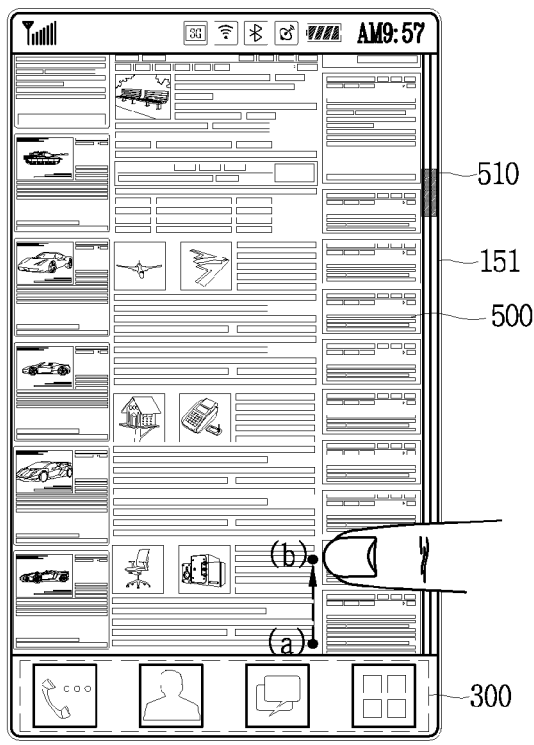

As illustrated in FIG. 8A, a screen image for a web page 500 may be displayed on the display unit 151. When a drag touch input moving from position (a) to position (b) on the screen image for the web page 500 is detected, such as illustrated in FIGS. 8A-8B, the screen image for the web page 500 may be scrolled in the drag touch input direction as illustrated in FIG. 8B. The controller 180 may determine a distance for scrolling the screen image for the webpage 500 using the dragged distance and drag touch input speed.

As illustrated in FIGS. 8A-8B, a scroll bar 510 indicating a ratio of scrolling may be displayed on the display unit 151. As the screen image of the webpage 500 is scrolled based on the dragged distance and drag touch input speed, a distance on which the scroll bar 510 is moved may be longer than the dragged distance.

Figure 9A:
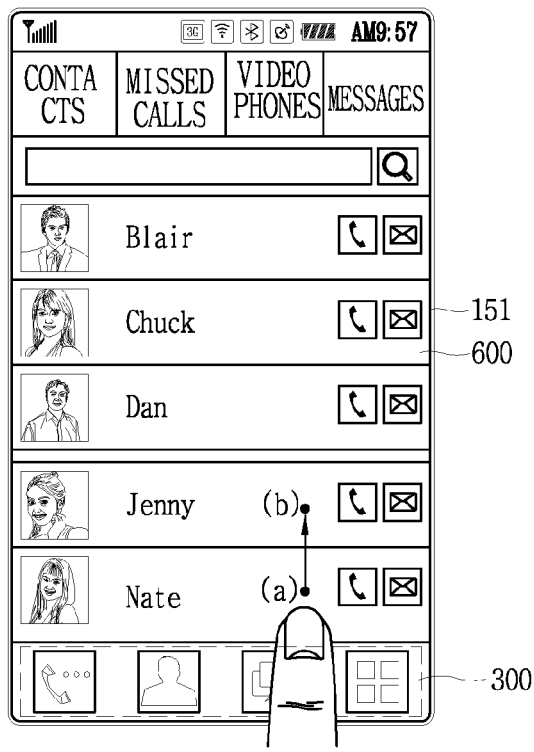
FIGS. 9A and 9B are views illustrating an example of a sixth operation of a mobile terminal according to FIG. 3.
Figure 9B:
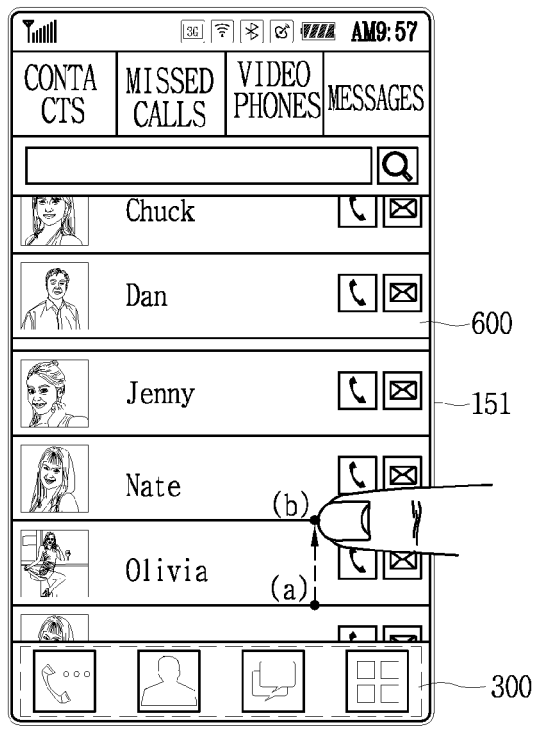

As illustrated in FIG. 9A, a screen image for a list 600 may be displayed on the display unit 151. When a drag touch input moving from position (a) to position (b) on the screen image for the list 600 is detected, such as illustrated in FIGS. 9A-9B, the screen image for the list 600 may be scrolled in the drag touch input direction based on the dragged distance and drag touch input speed as illustrated in FIG. 9B.

The screen image for the list 600 may be scrolled in a reverse direction of the drag touch input (not shown). For example, when a drag touch input is detected on a screen image for transmitted and received text message contents displayed on the display unit 151, the screen image for the transmitted and received text message contents may be scrolled in the reverse direction of the drag touch input.

Figure 10A:
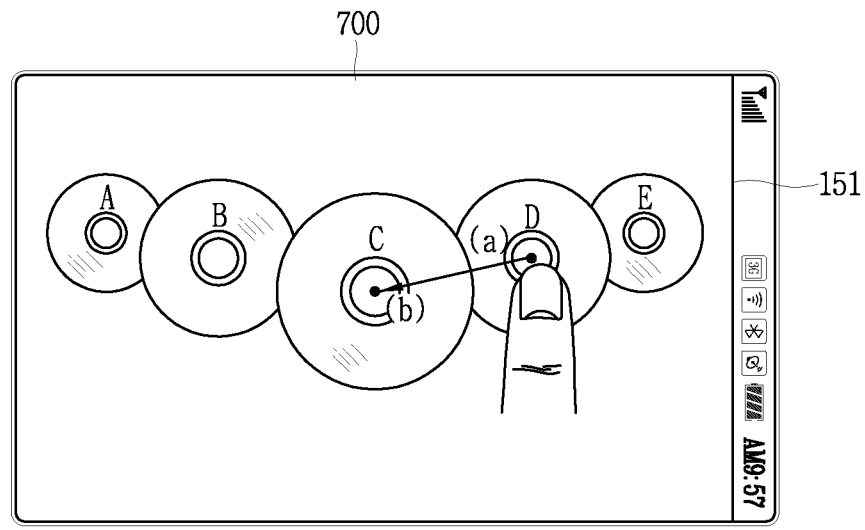
FIGS. 10A and 10B are views illustrating an example of a seventh operation of a mobile terminal according to FIG. 3.

Furthermore, as illustrated in FIG. 10A, a screen image for a cover flow 700 may be displayed on the display unit 151. When a drag touch input moving from position (a) to position (b) on the screen image for the cover flow 700 is detected, such as illustrated in FIGS. 10A-10B, the screen image for the cover flow 700 may be scrolled in the drag touch input direction as illustrated in FIG. 10B.

Figure 10B:
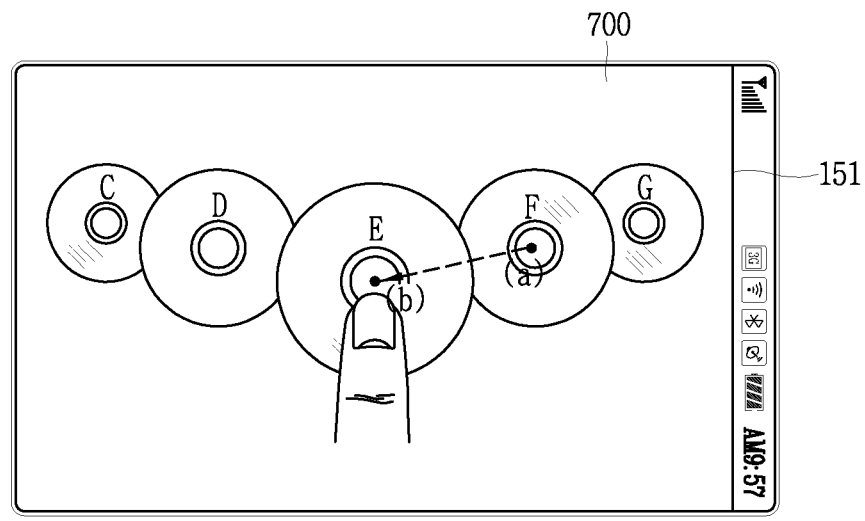

Specifically, when the drag touch input of one object length, such as from point (a) on second object D to point (b) on first object C, having a speed that is equal to or greater than a preset speed is detected, a third object E may move from its original position past the original position of the second object D depicted in FIG. 10A to the original position of the first object C depicted in FIG. 10A, as depicted in FIG. 10B. In other words, when the drag touch input speed is equal to or greater than the preset speed, the controller 180 may scroll the screen image for the cover flow 700 based on both the dragged distance and drag touch input speed.

However, when the drag touch input as long as one object length is detected but the drag touch input speed is less than the preset speed, the third object E may be moved only one object length, such as from the original position of the third object E depicted in FIG. 10A to the original position of the second object D depicted in FIG. 10A (not shown). In other words, when the drag touch input speed is less than the preset speed, the controller 180 may scroll the screen image based on only the dragged distance.

Figure 11A:
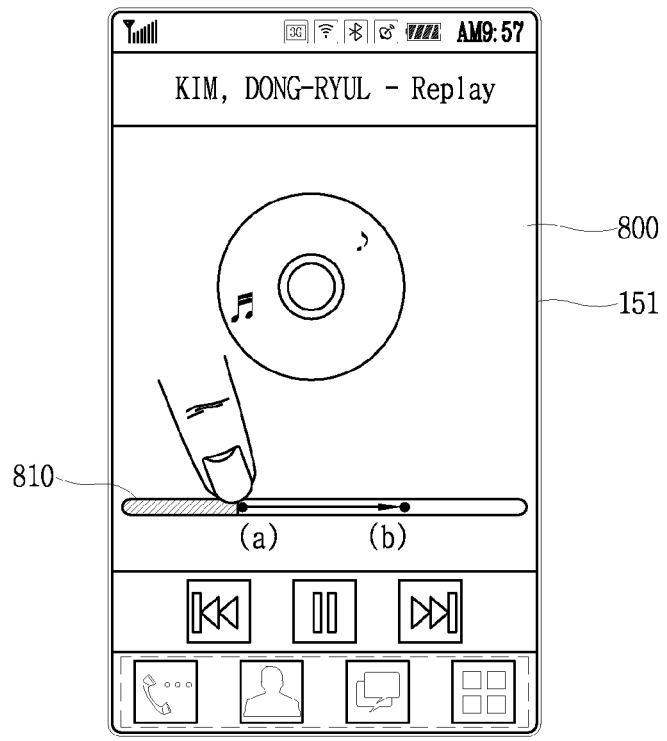
FIGS. 11A and 11B are views illustrating an example of an eighth operation of a mobile terminal according to FIG. 3.
Figure 11B:
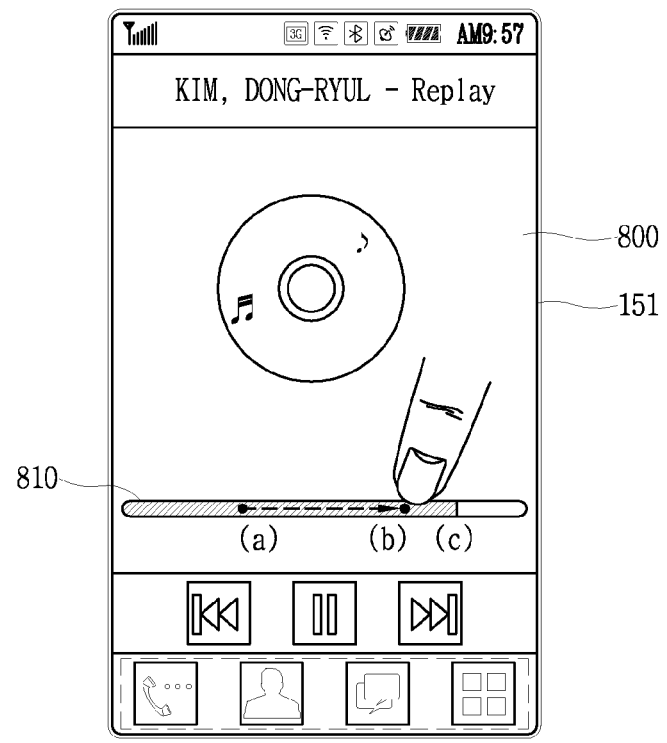

FIGS. 11A and 11B are views illustrating an example of an eighth operation of a mobile terminal 100 (FIG. 1) according to the method of FIGS. 3A and 3B. The mobile terminal 100 may include a display unit 151, a sensing unit 140 (FIG. 1), and a controller 180 (FIG. 1).

As illustrated in FIG. 11A, a screen image for a content reproduction screen 800 may be displayed on the display unit 151. A scroll bar 810 indicating a content reproduction position may be displayed on the screen image for a content reproduction screen 800.

When a drag touch input moving from position (a) to position (b) on the scroll bar 810 is detected, such as illustrated in FIGS. 11A-11B, and a speed of the drag touch input is greater that a preset speed, the controller 180 may determine a distance for scrolling based on the dragged distance and drag touch input speed and move the pointer of the scroll bar 810 to position (c), which is beyond position (b), as illustrated in FIG. 11B. Accordingly, the controller 180 may output an audio signal corresponding to a pointer position of the scroll bar 810 at position (c) through the audio output module 152 (FIG. 1).

Figure 12A:
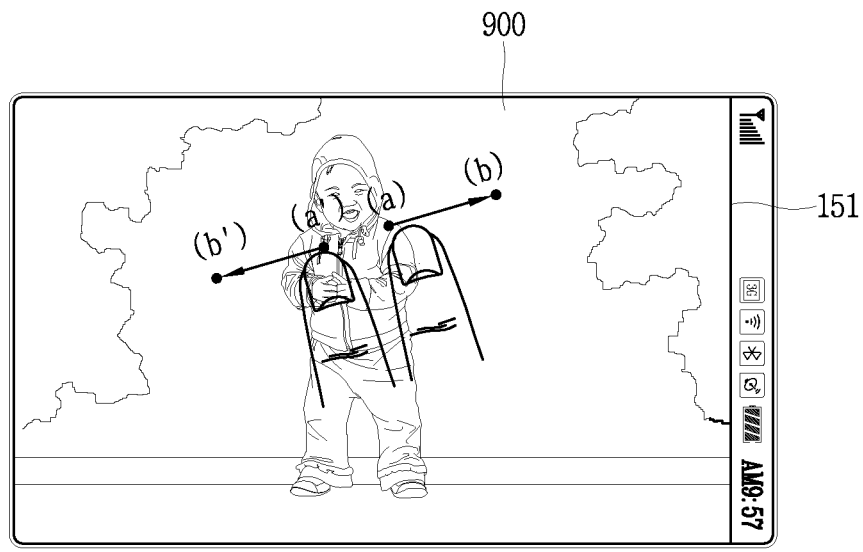
FIGS. 12A and 12B are views illustrating an example of a ninth operation of a mobile terminal according to FIG. 3.
Figure 12B:
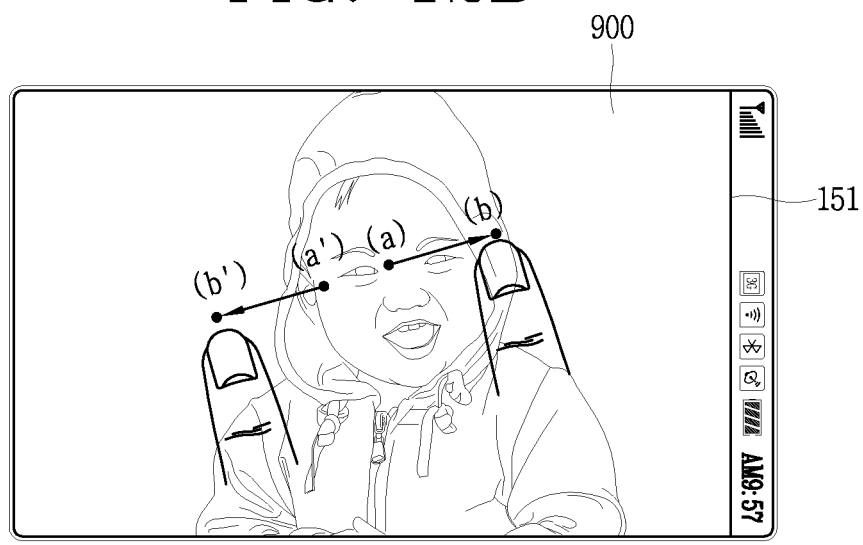

FIGS. 12A and 12B are views illustrating an example of a ninth operation of a mobile terminal 100 (FIG. 1) according to the method of FIGS. 3A and 3B. The mobile terminal 100 may include a display unit 151, a sensing unit 140 (FIG. 1), and a controller 180 (FIG. 1).

When a first drag touch input and a second drag touch input are detected on a screen image 900 displayed on the display unit 151 and the first drag touch input and the second drag touch input are in substantially opposite directions, the controller 180 may change a scale of the screen image 900 using a drag touch input speed for each of the first drag touch input and the second drag touch input. For example, when the first drag touch input and the second drag touch input move in substantially opposite directions away from each other, the controller 180 may increase the scale of the screen image 900 based on a drag touch input speed for each of the first drag touch input and the second drag touch input. Alternatively, when the first drag touch input and the second drag touch input move in substantially opposite directions toward each other, the controller 180 may reduce the scale of the screen image 900 based on the drag touch input speed for each of the first drag touch input and the second drag touch input.

In other words, as illustrated in FIGS. 12A-12B, when a first drag touch input moving from position (a) to position (b) and a second drag touch input moving from position (a') to position (b') on a screen image are detected when the screen image 900 is displayed on the display unit 151, the controller 180 may increase the scale of the screen image 900 based on the dragged distance and drag touch input speed for each of the first drag touch input and the second drag touch input, as depicted in FIG. 12B. However, when a speed of the first drag touch input and the second drag touch input is less than a preset speed, the controller 180 may enlarge the size of the screen image 900 based on only the dragged distance for each of the first drag touch input and the second drag touch input.

The foregoing methods may be implemented as codes readable by a processor on a medium written by a program. Examples of the processor-readable media may include ROM, RAM, CD-ROM, magnetic tape, floppy disk, and optical data storage device, and also include a device implemented in the form of a carrier wave, such as transmission via the Internet.

The foregoing embodiments are merely exemplary and are not to be construed as limiting. The present teachings can be readily applied to other types of apparatuses. This description is intended to be illustrative only, and not to limit the scope of the appended claims. Many alternatives, modifications, and variations will be apparent to those skilled in the art upon perusal of this disclosure. The features, structures, methods, and other characteristics of the exemplary embodiments described herein may be combined in various ways to obtain additional and/or alternative exemplary embodiments.

As the features described previously may be embodied in several forms without departing from the characteristics thereof, it should also be understood that the above-described embodiments are not limited by any of the details of the foregoing description, unless otherwise specified, but rather should be construed broadly within its scope as defined in the appended claims and their equivalents.

What is claimed is:

1. A mobile terminal, comprising:
a display; and
a hardware controller operatively coupled to the display and being configured to:
control the display to display a first screen comprising a plurality of user selectable items, wherein prior to a first drag input being received, a second screen different from the first screen is not displayed on the display, and the first screen and the second screen have a rectangular shape, wherein the second screen includes a plurality of user selectable items, wherein the first screen and the second screen are among a plurality of screens of at least three screens that are sequentially displayable on the display, wherein portions of no more than two of the plurality of screens are simultaneously displayable on the display while the first drag input is being received, wherein each of the plurality of user selectable items of the first screen and each of the plurality of user selectable items comprise a rectangular shape;
control the display to display an indicator for indicating an order of a currently displayed screen, relative to other screens among the plurality of screens displayable on the display;
change a shape of the first screen from the rectangular shape to a trapezoidal shape, and change a shape of the second screen from the rectangular shape to a trapezoidal shape, both based on the first drag input being received; and control the display to display a portion of the first screen having the trapezoidal shape and a portion of the second screen having the trapezoidal shape while the first drag input is being received, wherein a displayed vertical edge of the trapezoidal shape of the first screen decreases in length and a displayed vertical edge of the trapezoidal shape of the second screen increases in length in a manner that corresponds to increasing lengths of the first drag input, wherein the vertical edge of the trapezoidal shape of the first screen is adjacent to the vertical edge of the trapezoidal shape of the second screen;

control the display to repeatedly reduce the displayed portion of the first screen having the trapezoidal shape and correspondingly repeatedly increase the displayed portion of the second screen having the trapezoidal shape in response to increasing distances of the first drag input;

control the display to display a number of the plurality of selectable items of the first screen and a number of the plurality of selectable items of the second screen while the first drag input is being received, wherein each of the number of plurality of selectable items of the first screen and each of the number of plurality of selectable items of the first second have a trapezoidal shape while the first drag input is being received;

control the display to repeatedly reduce the displayed number of the plurality of selectable items of the first screen and repeatedly increase the displayed number of the plurality of selectable items of the second screen according to increasing lengths of the first drag input;

control the display to display the first screen having the trapezoidal shape with a size that is larger than a size of the second screen having the trapezoidal shape, when the first drag input is applied for a first distance, wherein when the first drag input is applied for the first distance the first screen is the currently displayed screen;

change the size of the first screen having the trapezoidal shape and change the size of the second screen having the trapezoidal shape such that the size of the first screen having the trapezoidal shape is smaller than the size of the second screen having the trapezoidal shape, when the first drag input is applied for a second distance longer than the first distance; and control the display to continue to display the indicator while the first drag input is applied, wherein when the first drag input is applied for the second distance the second screen is the currently displayed screen.

2. The mobile terminal of claim 1, wherein the controller is further configured to:

cause scrolling of the plurality of user selectable items of the first screen, while the first drag input is being received, and control displaying of a scroll bar on the display, wherein the scroll bar indicates a distance of the scrolling.

3. The mobile terminal of claim 1, wherein the first screen comprises at least a home screen, a dock screen, a cover flow, a web page, or a list.

4. The mobile terminal of claim 1, wherein the hardware controller is further configured to:

cause the display to display a third screen comprising a plurality of user selectable items together with the first screen prior to the first drag input being received within the first screen, wherein a fourth screen is not displayed on the display prior to a second drag input being received within the third screen; and cause the display to display a portion of the third screen and a portion of the fourth screen while the second drag input is being received within the third screen, wherein the first drag input does not cause the displaying of the portion of the third screen and the portion of the fourth screen, and the second drag input does not cause displaying of the portion of the first screen having the trapezoidal shape and the portion of the second screen having the trapezoidal shape.

5. The mobile terminal of claim 1, wherein the displayed plurality of user selectable items of the first screen are maintained in a same spatial relationship to each other while the first drag input is being received.

6. A method of controlling a mobile terminal, the method comprising:

displaying, on a display of the mobile terminal, a first screen comprising a plurality of user selectable item, wherein prior to a first drag input being received, a second screen different from the first screen is not displayed on the display, and the first screen and the second screen have a rectangular shape, wherein the second screen includes a plurality of user selectable items, wherein the first screen and the second screen are among a plurality of screens of at least three screens that are sequentially displayable on the display, wherein portions of no more than two of the plurality of screens are simultaneously displayable on the display while the first drag input is being received, wherein each of the plurality of user selectable items of the first screen and each of the plurality of user selectable items comprise a rectangular shape;

displaying, on the display, an indicator for indicating an order of a currently displayed screen, relative to other screens among the plurality of screens displayable on the display;

changing a shape of the first screen from the rectangular shape to a trapezoidal shape, and change a shape of the second screen from the rectangular shape to a trapezoidal shape based on the first drag input being received;

displaying, on the display of the mobile terminal, a portion of the first screen having the trapezoidal shape and a portion of the second screen having the trapezoidal shape while the first drag input is being received, wherein a displayed vertical edge of the trapezoidal shape of the first screen decreases in length and a displayed vertical edge of the trapezoidal shape of the second screen increases in length in a manner that corresponds to increasing lengths of the first drag input, wherein the vertical edge of the trapezoidal shape of the first screen is adjacent to the vertical edge of the trapezoidal shape of the second screen;

repeatedly reducing the displayed portion of the first screen having the trapezoidal shape and correspondingly repeatedly increasing the displayed portion of the second screen having the trapezoidal shape in response to increasing distances of the first drag input;

displaying, on the display, a number of the plurality of selectable items of the first screen and a number of the plurality of selectable items of the second screen while the first drag input is being received, wherein each of the number of plurality of selectable items of the first screen and each of the number of plurality of selectable items of the first second have a trapezoidal shape while the first drag input is being received;

controlling the display to repeatedly reduce the displayed number of the plurality of selectable items of the first screen and repeatedly increase the displayed number of the plurality of selectable items of the second screen according to increasing lengths of the first drag input;

displaying, on the display, the first screen having the trapezoidal shape with a size that is larger than a size of the second screen having the trapezoidal shape, when the first drag input is applied for a first distance, wherein when the first drag input is applied for the first distance the first screen is the currently displayed screen;

changing the size of the first screen having the trapezoidal shape and changing the size of the second screen having the trapezoidal shape such that the size of the first screen having the trapezoidal shape is smaller than the size of the second screen having the trapezoidal shape, when the first drag input is applied for a second distance longer than the first distance; and continuing to display the indicator while the first drag input is applied, wherein when the first drag input is applied for the second distance the second screen is the currently displayed screen.

7. The method of claim 6, wherein the first screen comprises at least a home screen, a dock screen, a cover flow, a web page, or a list.

8. The method of claim 6, further comprising:

displaying, on the display, a third screen comprising a plurality of user selectable items together with the first screen prior to the first drag input being received within the first screen, wherein a fourth screen is not displayed on the display prior to a second drag input being received within the third screen; and displaying, on the display, a portion of the third screen and a portion of the fourth screen while the second drag input is being received within the third screen, wherein the first drag input does not cause the displaying of the portion of the third screen and the portion of the fourth screen, and the second drag input does not cause the displaying of the portion of the first screen having the trapezoidal shape and the portion of the second screen having the trapezoidal shape.

9. The method of claim 6, wherein the displayed plurality of user selectable items of the first screen are maintained in a same spatial relationship to each other while the first drag input is being received.

* * * * *